(12) United States Patent
Speers et al.

(10) Patent No.: US 6,688,450 B2
(45) Date of Patent: Feb. 10, 2004

(54) MOBILE CONVEYOR FOR PAVING VEHICLES

(75) Inventors: Leonard E. Speers, Lerna, IL (US); William R. Schwelitz, Champaign, IL (US); Robert W. Begley, Charleston, IL (US); Terry K. Olson, West Fargo, ND (US); Ben J. Huisman, Hickson, ND (US); Jason P. Wiese, Dyersville, IA (US); Shane Kruse, Fargo, ND (US)

(73) Assignee: Blaw-Knox Construction Equipment Corporation, Mattoon, IL (US)

( * ) Notice: Subject to any disclaimer, the term of this patent is extended or adjusted under 35 U.S.C. 154(b) by 0 days.

(21) Appl. No.: 10/145,056

(22) Filed: May 14, 2002

(65) Prior Publication Data

US 2003/0010600 A1 Jan. 16, 2003

Related U.S. Application Data

(63) Continuation-in-part of application No. 09/845,135, filed on Apr. 30, 2001, now Pat. No. 6,386,352.

(51) Int. Cl.$^7$ ............................................. B65G 21/10
(52) U.S. Cl. .................... 198/312; 198/317; 198/303
(58) Field of Search .................... 198/300, 303, 198/312, 306, 309, 317, 318, 320, 315, 314

(56) References Cited

U.S. PATENT DOCUMENTS

| | | | |
|---|---|---|---|
| 2,856,062 A | | 10/1958 | Kling |
| 2,991,895 A | | 7/1961 | Dietzenbach |
| 3,150,756 A | | 9/1964 | Stauth |
| 3,294,214 A | * | 12/1966 | Tweten ........................ 198/312 |
| 4,579,479 A | | 4/1986 | Bryant |
| 4,805,756 A | * | 2/1989 | Kolleth et al. .............. 198/314 |
| 4,944,630 A | | 7/1990 | Brock et al. |
| 4,951,801 A | * | 8/1990 | Mraz .......................... 198/303 |
| 5,000,615 A | | 3/1991 | Murray |
| 5,090,549 A | * | 2/1992 | Thiel .......................... 198/312 |
| 5,193,971 A | | 3/1993 | Pettijohn |
| 5,201,603 A | | 4/1993 | Bassett et al. |
| 5,522,670 A | | 6/1996 | Gilmore et al. |
| 5,911,300 A | * | 6/1999 | Mraz .......................... 198/303 |
| 6,006,894 A | * | 12/1999 | Gibbs et al. ................ 198/315 |

* cited by examiner

*Primary Examiner*—James R. Bidwell
(74) *Attorney, Agent, or Firm*—Michael Best & Friedrich LLP

(57) ABSTRACT

A conveyor assembly is for use with a vehicle having a wheel pivotable about an axis and an actuator configured to pivot the wheel. The conveyor assembly includes a carriage connectable with the vehicle and having a wheel pivotable about an axis, a swing axis and a first bearing surface about the swing axis. A carriage steering actuator pivots the carriage wheel about its axis in one direction when the vehicle actuator pivots the vehicle wheel about its axis in an opposing direction. A conveyor connected with the carriage has a second bearing surface engaged about the first bearing surface. Further, a swing actuator rotates the conveyor about the swing axis such that the second bearing surface linearly displaces along a first arcuate path as an actuator end displaces along a second arcuate path, configured such that the bearing surface displacement is greater than the actuator end displacement.

42 Claims, 11 Drawing Sheets

MOBILE CONVEYOR FOR PAVING VEHICLES

This application is a continuation-in-part of U.S. application Ser. No. 09/845,135, filed Apr. 30, 2001 now U.S. Pat. No. 6,386,352.

BACKGROUND OF THE INVENTION

The invention relates to paving vehicles, and more particularly to mobile conveyor systems used with road paving vehicles.

Paving vehicles or "pavers" are well known and basically function to deposit, level and compact paving material, typically asphalt or concrete, onto a base surface (e.g., a road bed) so as to form a mat of paving material. Paving vehicles generally include a front-mounted hopper inside which a quantity of paving material is temporarily held. During a paving operation, the paving material is conveyed from the hopper to the rear of the vehicle and is deposited onto a base surface for leveling by a screed towed from the paver. As such, the quantity of material in the hopper is continuously consumed during the paving operation so that the hopper must be re-supplied with paving material. To keep the paver hopper supplied with paving material, one of the following methods is generally used.

First, a dump truck may be backed up to the front of the paver, allowing material to be directly dumped or deposited into the hopper from the bed or bin of the truck. Using a dump truck to periodically refill the paver hopper requires that the truck driver carefully backs up to the paver and adjusts the truck speed to match the paver travel speed in order to avoid colliding with the paver, such collisions generally causing ripples to form in the material mat. The second common approach is to use a second vehicle, commonly referred to as a "material transfer" vehicle, which travels forwardly of the paver during the entire paver operation and continuously conveys material from an on-board hopper to the paver hopper. The transfer vehicle hopper is then intermittently re-supplied with material by a dump truck, and any collisions between the transfer vehicle and the dump truck will generally not effect the quality of the pavement formed by the paver as the transfer vehicle and paver are not connected.

In general, such transfer vehicles include a chassis, a hopper mounted to the front of the chassis and a conveyor extending longitudinally from the hopper to the rear of the chassis. The conveyor has a inlet end disposed in the hopper and a discharge end extending over the rear of the chassis, the conveyor being inclined such that the discharge end is spaced higher than the inlet end. As such, when the material transfer vehicle is located forwardly of the paver, the discharge end of the transfer vehicle conveyor is located above the paver hopper, allowing paving material to be conveyed from the transfer vehicle hopper to fall-off the discharge end and into the paver hopper.

In certain applications, it is necessary to convey material from a transfer vehicle to a paver travelling parallel to the transfer vehicle, i.e., to a paver arranged offset to one side of the transfer vehicle rather than generally behind the vehicle. Examples of such situations are when the roadbed being paved is too soft for a dump truck to travel upon or when paving over a barrier, where a truck is too large to reach. To accomplish this, the transfer vehicle is either provided with a second, rotatable conveyor mounted on the vehicle chassis to the rear of the first or primary conveyor, or a separate conveyor assembly is towed from the rear of the transfer vehicle. In either case, the second conveyor, referred to as a "swing" conveyor, is able to rotate or swing to either side of the transfer vehicle to enable material to be transported to the offset paver. Although both of these methods of transferring paving material to an offset paver have been useful, each approach has certain limitations or drawbacks, as follows.

With a transfer vehicle having a second conveyor mounted directly on the chassis of the transfer vehicle, the transfer vehicle is more complex and generally requires the second conveyor to be used at all times, even when the paver is following directly behind the transfer vehicle in a standard paving operation. As such, the second, unnecessary conveying operation on the transfer vehicle results in wasted power consumption and excessive wear on the second conveyor. A separately towed conveyor has the advantage of being removable so that only the primary conveyor is used for a standard paving operation, but also has certain drawbacks. One limitation is that known towed conveyors generally either have only a limited range of rotation, such that the swing conveyor cannot reach a full 90° to either side, or a full rotation requires certain adjustment of mechanisms for rotating the conveyor, thereby requiring set-up time to adjust the swing conveyor as desired. Another drawback with towed conveyors is that the conveyor generally rolls upon two fixed or non-steerable wheels, such that the towed conveyor is unable to be follow the transfer vehicle when the vehicle is travelling a curved path, causing the swing conveyor to drift to one side of the vehicle and potentially moving the conveyor inlet end from beneath the primary conveyor discharge end as required.

Therefore, it would be desirable to provide a towed or "mobile" conveyor that overcomes the limitations of previously known towed conveyors.

BRIEF SUMMARY OF THE INVENTION

In a first aspect, the present invention is a mobile conveyor assembly for use with a construction vehicle. The vehicle has a wheel pivotable about a pivot axis and a steering actuator configured to pivot the wheel about the axis. The conveyor assembly comprises a carriage removably connectable with the vehicle and having a wheel pivotable about a pivot axis. A conveyor is mounted to the carriage. Further, a steering actuator is connected with the carriage wheel and is operably connectable with the vehicle actuator. The carriage actuator is configured to pivot the carriage wheel about the carriage wheel pivot axis in a first angular direction when the vehicle actuator pivots the vehicle wheel about the vehicle wheel pivot axis in a second, opposing angular direction.

In another aspect, the present invention is a construction vehicle assembly comprising a first frame having at least one wheel pivotable about a first pivot axis. A first steering actuator is configured to pivot the wheel about the axis. A second frame is removably connectable with the first frame and has at least one wheel pivotable about a second pivot axis. Further, a second steering actuator is operatively connected with the second frame wheel and operably connectable with the first steering actuator. The second steering actuator is configured to pivot the second frame wheel about the second pivot axis in a first angular direction when the first steering actuator pivots the first frame wheel about the first wheel pivot axis in a second, opposing angular direction.

In yet another aspect, the present invention is a conveyor assembly comprising a base having a pivot axis and a first circumferential bearing surface extending at least partially about the axis. A conveyor is rotatably connected with the base and has a second circumferential bearing surface slidably disposed against the first bearing surface. The second bearing surface is displaceable with respect to the first bearing surface along a first arcuate path having a first radius about the pivot axis. An actuator has an end connected with the base and is configured to rotate the conveyor about the axis such that the second bearing surface displaces along the first arcuate path as the actuator end displaces along a second arcuate path having a second radius about the axis. The first path radius is substantially greater than the second path radius such that a magnitude of the second bearing surface displacement is substantially greater than a magnitude of the actuator end displacement.

In an even further aspect, the present invention is a also conveyor assembly comprising a base having a pivot axis and a first, generally annular bearing body connected with the base and substantially centered about the axis. A conveyor has a second generally annular bearing body slidably engaged with the first bearing body to rotatably connect the conveyor to the base. Further, an actuator has a first end connected with the base and a second end connected with the conveyor, the second end being disposed generally between the second bearing body and the axis. The actuator is configured to displace the second end with respect to the first end so as to rotatably displace the conveyor about the axis as the second bearing body slidably displaces with respect to the first bearing body.

In yet an even further aspect, the present invention is also a conveyor assembly comprising a conveyor base having a conveyor swing axis and a first circumferential bearing surface extending at least partially about the axis. A conveyor body is rotatably connected with the base and has a second circumferential bearing surface, the second bearing surface being slidably disposed against the first bearing surface and generally centered about the swing axis by a first radial distance. Further, a hydraulic cylinder has a cylinder body connected with the base and a rod displaceable with respect to the rod, the rod being connected with the conveyor at a position spaced from the swing axis by a second radial distance. The first radial distance is substantially greater than the second radial distance such that displacement of the rod angularly displaces the conveyor about the swing axis as the second circumferential surface linearly displaces with respect to the first circumferential surface. As such, a magnitude of displacement of the second circumferential surface is substantially greater than a magnitude of displacement of the rod.

In a yet another further aspect, the present invention is again a mobile conveyor assembly for use with the construction vehicle. The conveyor assembly comprises a carriage removably connectable with the vehicle and having a wheel pivotable about a pivot axis, a swing axis and a first circumferential bearing surface extending at least partially about the swing axis. A steering actuator is connected with the carriage wheel and operably connectable with the vehicle actuator, the carriage actuator being configured to pivot the carriage wheel about the carriage wheel pivot axis in a first angular direction when the vehicle actuator pivots the vehicle wheel about the vehicle wheel pivot axis in a second, opposing angular direction. Further, a conveyor is rotatably connected with the base and having a second circumferential bearing surface slidably disposed against the first bearing surface, the second bearing surface being linearly displaceable with respect to the first bearing surface along a first arcuate path having a first radius about the pivot axis. Furthermore, a swing actuator has an end connected with the conveyor, the actuator being configured to angularly displace the conveyor about the swing axis such that the second bearing surface linearly displaces along the first arcuate path as the actuator end linearly displaces along a second arcuate path having a second radius about the axis. The first path radius is substantially greater than the second path radius such that a magnitude of the second bearing surface linear displacement is substantially greater than a magnitude of the actuator end linear displacement.

BRIEF DESCRIPTION OF THE DRAWINGS

The foregoing summary, as well as the detailed description of the preferred embodiments of the invention, will be better understood when read in conjunction with the appended drawings. For the purpose of illustrating the invention, there is shown in the drawings, which are diagrammatic, embodiments that are presently preferred. It should be understood, however, that the invention is not limited to the precise arrangements and instrumentalities shown. In the drawings.

DETAILED DESCRIPTION OF THE INVENTION

Figure 1:
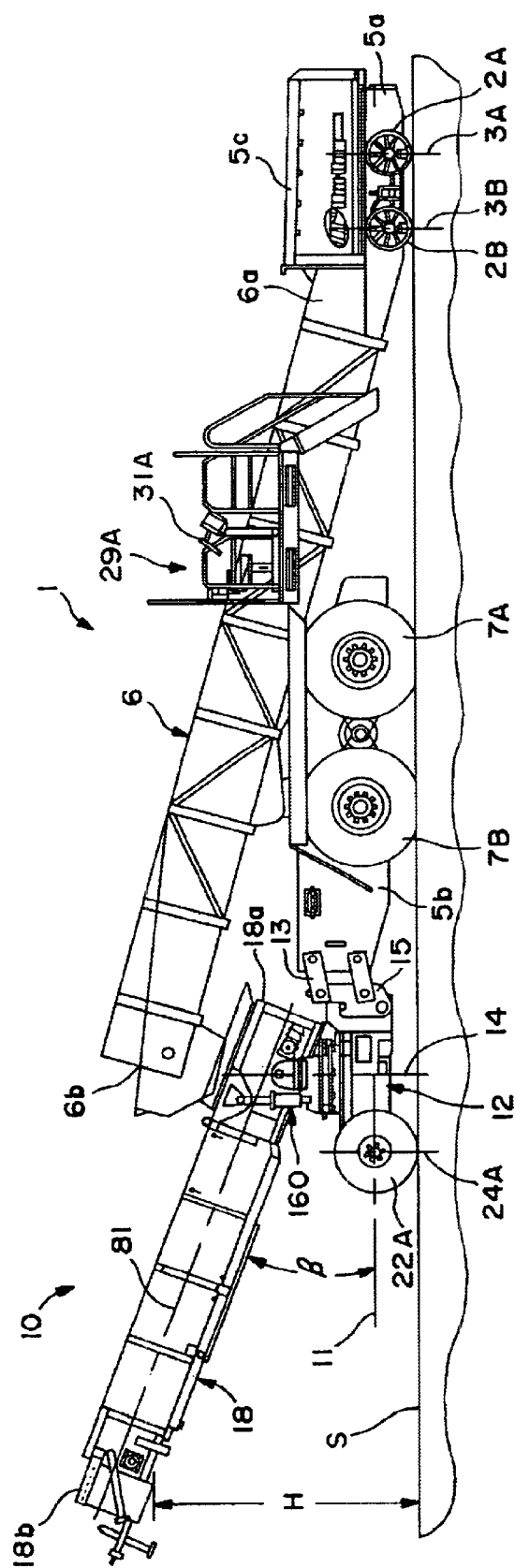
FIG. 1 is a side elevational view of a conveyor assembly in accordance with the present invention, shown mounted to the rear of a material transfer vehicle.

Certain terminology is used in the following description for convenience only and is not limiting. The words "upper", "upward", and "lower" refer to directions toward and away from, respectively, a designated upper end of the mobile conveyor assembly or a component thereof. The words "inner" "inwardly" and "outer" refer to directions toward and away from, respectively, a designated axis, centerline or geometric center. Further, the term "front", "frontward" and "rear", "rearward" refer to directions toward and away from, respectively, a designated front end of the mobile conveyor assembly, of a transfer vehicle or of a particular component thereof. Furthermore, the words "right" "rightward" and "left" "leftward" respectively refer to directions in a drawing, to a specified "turning" direction or a designated portion of the conveyor assembly, or transfer vehicle, the particular meaning intended being readily apparent from the context of the description. Further, the terms "clockwise" and "counterclockwise" refer to rotational directions about a designated axis as viewed in the drawing to which such reference is made. The terminology includes the words specifically mentioned above, derivatives thereof, and words or similar import.

Referring now to the drawings in detail, wherein like numbers are used to indicate like elements throughout, there is shown in FIGS. 1–14 a presently preferred embodiment of a mobile conveyor assembly 10 for use with a construction vehicle 1. The vehicle 1 has at least one steerable wheel and preferably two pairs of steerable wheels 2A, 2B and 2C, 2D, each wheel of each pair being pivotable about a separate pivot axis 3A, 3B, 3C and 3D, respectively, and a steering mechanism 4 including at least one and preferably two actuators 8 and 9 (FIG. 8) each configured to pivot each pair of wheels 2A, 2B and 2C, 2D, respectively, about the respective axes 3A, 3B, 3C and 3D. Preferably, the vehicle 1 further includes a primary conveyor 6 having an inlet end 6a and a discharge end 6b spaced from the inlet end 6a, as discussed in further detail below.

The conveyor assembly 10 basically comprises a mobile conveyor base or carriage 12 removably or demountably connectable with the vehicle 1 and a conveyor 18 mounted to the carriage 12. The carriage 12 has a conveyor swing axis 14 and a first circumferential bearing surface 16 extending at least partially about the axis 14. Preferably, the bearing surface 16 is provided by a first generally annular body 50 connected with the carriage 12 and substantially centered about the axis 14. Further, the conveyor 18 has an inlet end 18a disposed proximal to the carriage 12 and disposed generally beneath the primary conveyor discharge end 6b when the carriage 12 is connected with the vehicle 1. Also, the carriage 12 further includes at least one and preferably first and second wheels 22A, 22B, respectively, each movably connected with the carriage 12 so as to be pivotable about a separate carriage wheel pivot axis 24A, 24B, respectively.

Figure 8:
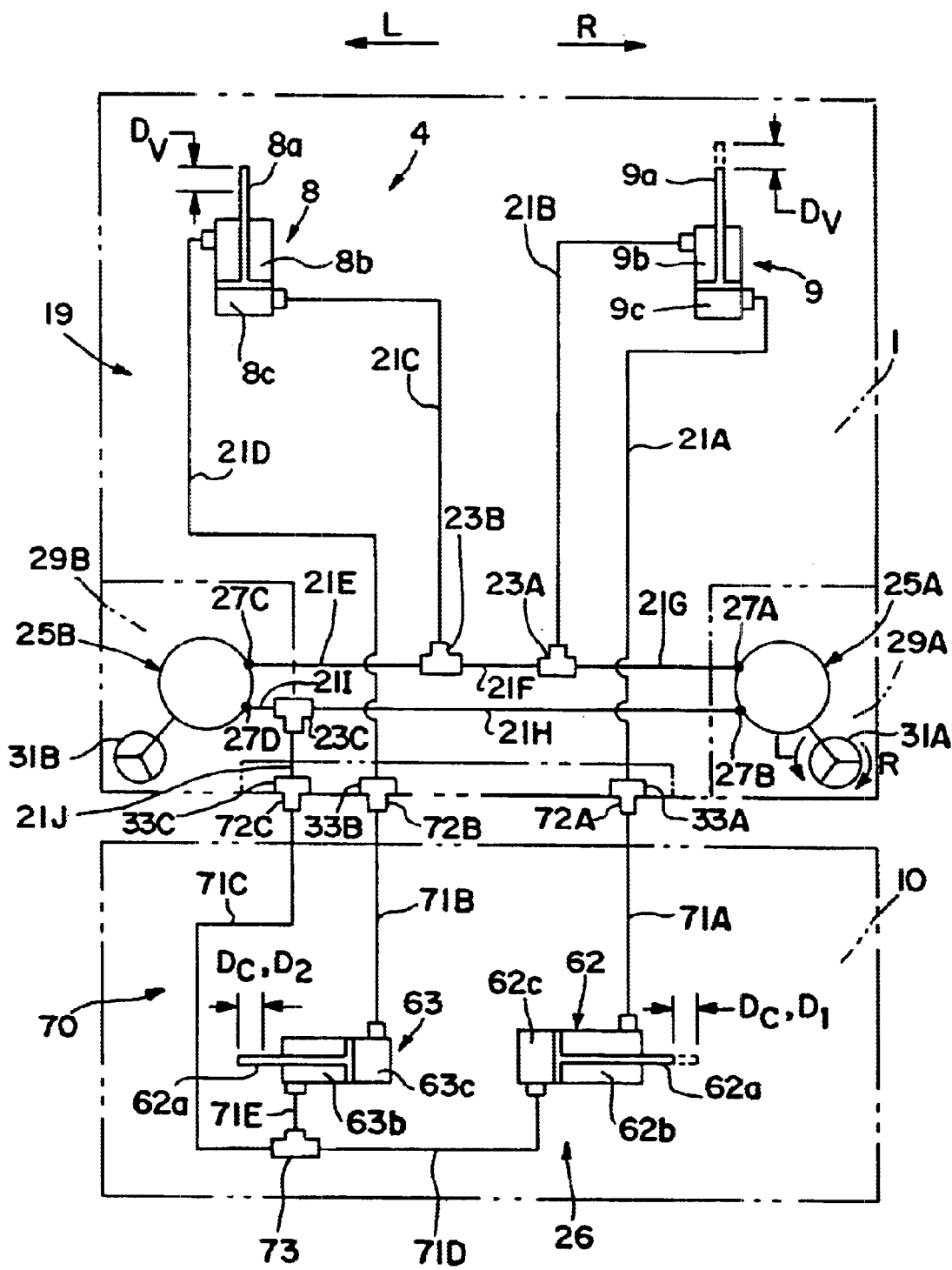
FIG. 8 is a schematic view of interconnected steering fluid circuits of the transfer vehicle and the mobile conveyor assembly, with the vehicle and mobile conveyor assembly (and portions of each) shown in phantom.

Further, the conveyor assembly 10 also includes a steering mechanism 26 including at least one and preferably two actuators 62 and 63 each connected with the carriage wheels 22A, 22B, respectively, and operably connectable with the vehicle steering actuators 8, 9 (see FIG. 8). The carriage steering actuators 62, 63 are configured to pivot each carriage wheel 22A, 22B about the associated carriage wheel pivot axis 24A, 24B in a first angular direction $A_1$ (e.g., clockwise) when the vehicle steering actuators 8, 9 pivot each vehicle wheel 2A, 2B, 2C and 2D about the respective vehicle wheel pivot axis 3A, 3B, 3C and 3D in a second, opposing angular direction $A_2$ (e.g., counterclockwise). Also, the carriage steering actuators 62, 63 are further configured to alternatively pivot the carriage wheels 22A, 22B in the second angular direction $A_2$ when the vehicle steering actuators 8, 9 pivot the vehicle wheels 2A, 2B, 2C and 2D in the first angular direction $A_1$. As such, the carriage steering actuators 62, 63 are configured to pivot the carriage wheels 22A, 22B about the respective carriage wheel pivot axes 24A, 24B so as to maintain the conveyor inlet end 18a disposed generally beneath the primary conveyor discharge end 6b when the vehicle wheels 2A, 2B, 2C and 2D pivot about the respective vehicle wheel pivot axes 3A, 3B, 3C and 3D.

Referring to FIGS. 1, 2, 13 and 14, the conveyor 18 is preferably rotatably connected with the carriage 12 such that the conveyor 18 is angularly or rotatably displaceable about the swing axis 14. More specifically, the conveyor 18 has longitudinal centerline 81 and is rotatable about the swing axis 14 to vary or adjust the angular position, as indicated by angle α (see, e.g., FIG. 12), of the conveyor centerline 81 with respect to a generally horizontal, longitudinal centerline 11 extending through the carriage 12. Preferably, the conveyor 18 has a second circumferential bearing surface 28 slidably disposed against the first bearing surface 16 of the carriage 12. Referrring particularly to FIG. 13, the second bearing surface 28 is slidably or linearly displaceable with respect to the first bearing surface 16 along a first arcuate path $P_1$ (shown partially and in phantom) having a first radius $R_1$ about the conveyor swing axis 14. Further, the second bearing surface 28 is preferably provided by a second generally annular body 90 slidably engaged with the first bearing body 50 to rotatably connect the conveyor 18 to the carriage 12.

Figure 13:
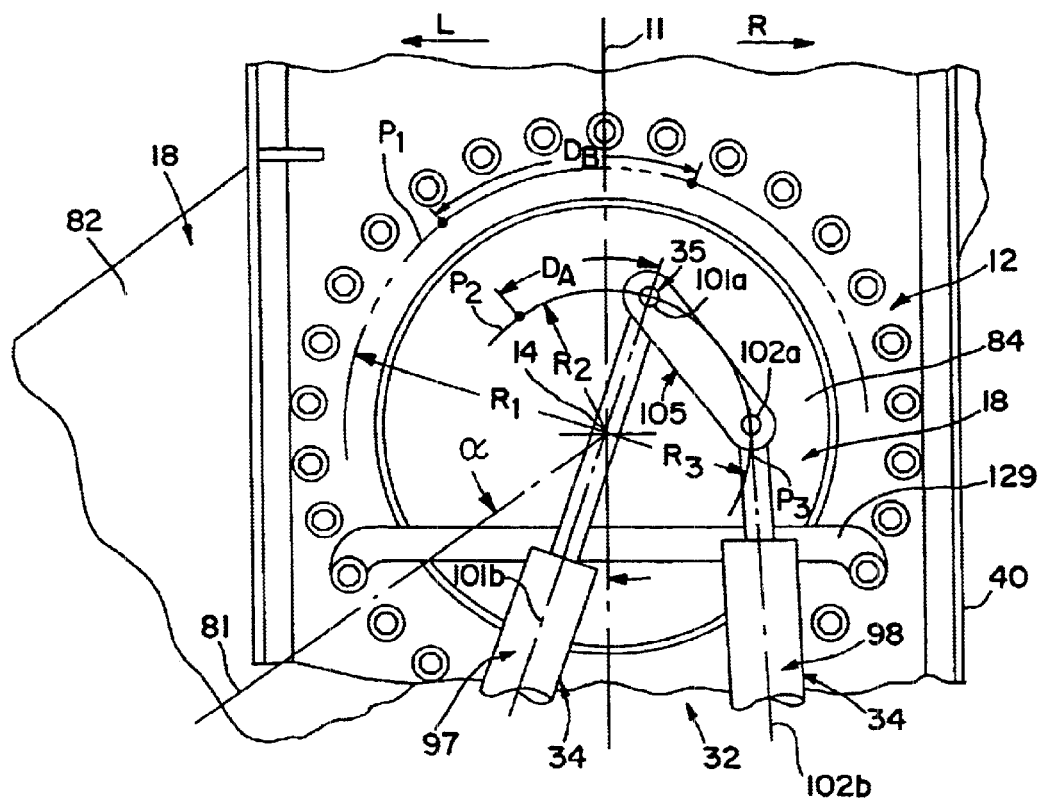
FIG. 13 is a more enlarged, broken-away bottom plan view of the conveyor assembly, showing portions of the swing assembly in a third, "45°-offset" position.

Also, the conveyor assembly 10 further includes a conveyor articulation or "swing" mechanism 32 including at least one actuator 34 having a first end 35 connected with the conveyor 18 and a second end 36 connected with the carriage 12. Preferably, the actuator first end 35 is disposed generally between the second bearing body 90 and the swing axis 14 so as to be spaced from the swing axis by a second radial distance or radius $R_2$. As best shown in FIG. 13, the actuator first end 35 is displaceable with respect to the actuator second end 36 so as to linearly displace along another or second arcuate path $P_2$ having a radius, specifically the second radius $R_2$, about the conveyor swing axis 14. The conveyor swing actuator 34 is configured to linearly displace the actuator first end 35 so as to rotate or angularly displace the conveyor 18 with respect to the carriage 12 about the conveyor swing axis 14 as the second bearing surface 28 linearly displaces at least partially along the first arcuate path $P_1$. The first path radius $R_1$ is substantially greater than the second path radius $R_2$, such that a magnitude of the second bearing surface linear displacement $D_B$ is correspondingly substantially greater than a magnitude of the actuator first end linear displacement $D_A$.

With such an arrangement, the conveyor swing mechanism 32 is able to produce a relatively large angular or rotational displacement of the conveyor 18 about the swing axis 14 with a relatively small or lesser actuator displacement(s). As such, the configuration of the swing mechanism 32 both reduces space required for installation and operation of the actuator 34 and potentially increases the response speed for rotatably or angularly positioning the conveyor 18 at a specific angular position about the swing axis 14, as discussed in further detail below. Each of the above-recited basic elements of the conveyor assembly 10 of the present invention is described in greater detail below.

Figure 9:
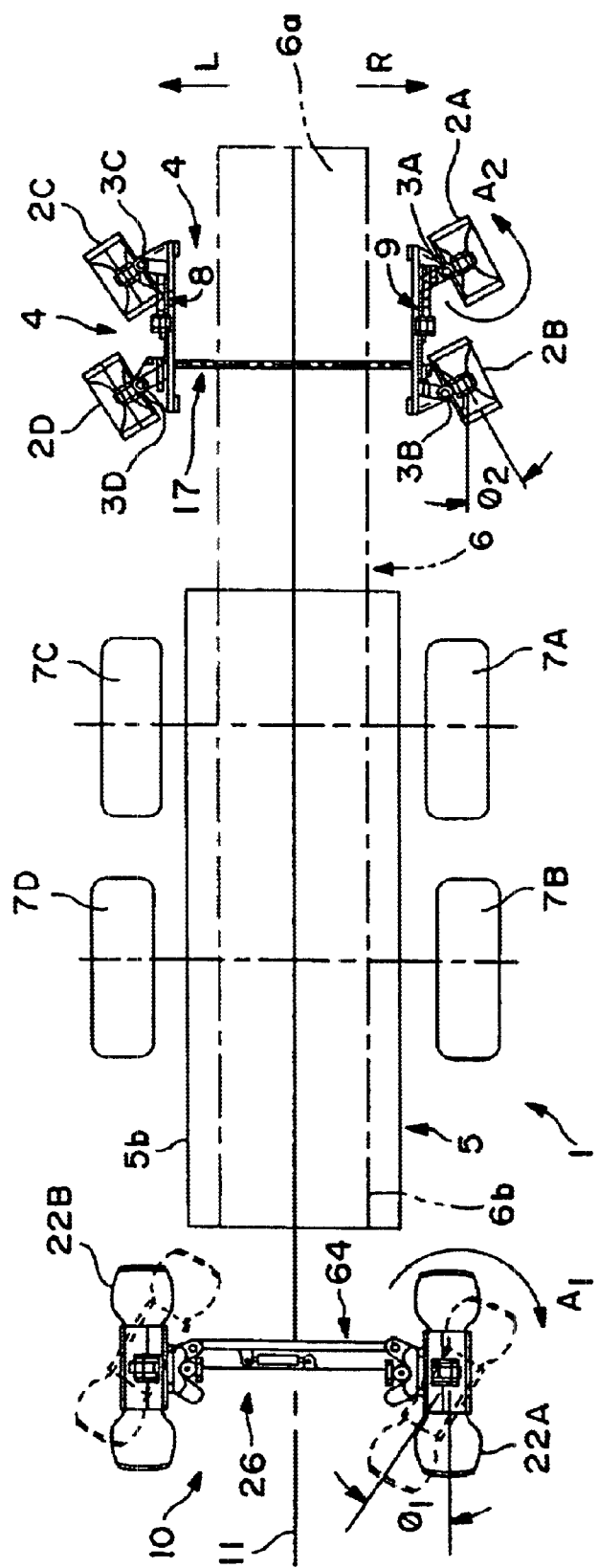
FIG. 9 is a top plan view of the wheel assembly of the conveyor carriage and the transfer vehicle wheel assembly, with portions of the vehicle and the conveyor assembly shown in phantom and depicting an alternative conveyor steering mechanism.

Referring now to FIGS. 1 and 9, the mobile conveyor assembly 10 of the present invention is preferably used with a type of construction vehicle 1 that is generally known in the paving art as a material transfer vehicle ("MTV"), as discussed in the Background Section above. The preferred material transfer vehicle 1 includes a chassis or frame 5 formed of a separate front portion and rear portion 5a, 5b, respectively, and having a material hopper 5c disposed at the front portion 5a. A fixed (i.e., non-rotatable) primary conveyor 6 extends longitudinally between the frame portions 5a and 5b and has an inlet end 6a disposed within the hopper 5c and a discharge end 6b extending over the rear of the vehicle 1. The two steerable vehicle wheel pairs 2A, 2B and 2C, 2D are spaced laterally and longitudinally apart and are rotatably mounted to the frame 5, preferably to the front portion 5a. Further, the vehicle 1 preferably includes two pairs of fixed or non-steerable wheels 7A, 7B and 7C, 7D that are spaced laterally and longitudinally apart and are mounted to the rear portion 5b of the chassis 5. Although the mobile conveyor assembly 10 is preferably used with a material transfer vehicle 1, the present conveyor assembly 10 may be used with any other type of construction vehicle 1 which utilizes or may utilize a conveyor to transport material, such as for example, another type of loader vehicle, a dump truck, an appropriate type of paver, etc.

Referring particularly to FIGS. 8 and 9, the vehicle steering mechanism 4 preferably includes at least one and most preferably two linear actuators 8, 9 mounted at appropriate locations on the chassis 5. Further, the linear actuators 8, 9 are preferably two hydraulic cylinders 8, 9, most preferably double-acting hydraulic cylinders each having a single rod 8a, 9a. The rods 8a, 9a of the two cylinders 8, 9, respectively, are each connected with the two vehicle wheel pairs 2A, 2B and 2C, 2D through an appropriately constructed steering linkage 17 (FIG. 9). Further, the vehicle steering cylinders 8 and 9 are each constructed or configured to allow fluid to pass from the cylinder 8 or 9 after the rod 8a, 9a, respectively, is "fully stroked". As such, the cylinders 8, 9 are able to compensate for fluid losses in the fluid circuit 19 (described below) connecting the cylinders 8 and 9 in order to ensure that a sufficient volume of fluid enters a fluidly connected cylinder, as described in detail below. Furthermore, although two cylinders 8 and 9 are preferred, the vehicle steering mechanism 4 may include only a single cylinder (not shown) connected with both pairs of wheels 2A, 2B and 2C, 2D through the linkage 17, and/or may include a rotary actuator(s), such as for example an electric or hydraulic motor (none shown).

Figure 2:
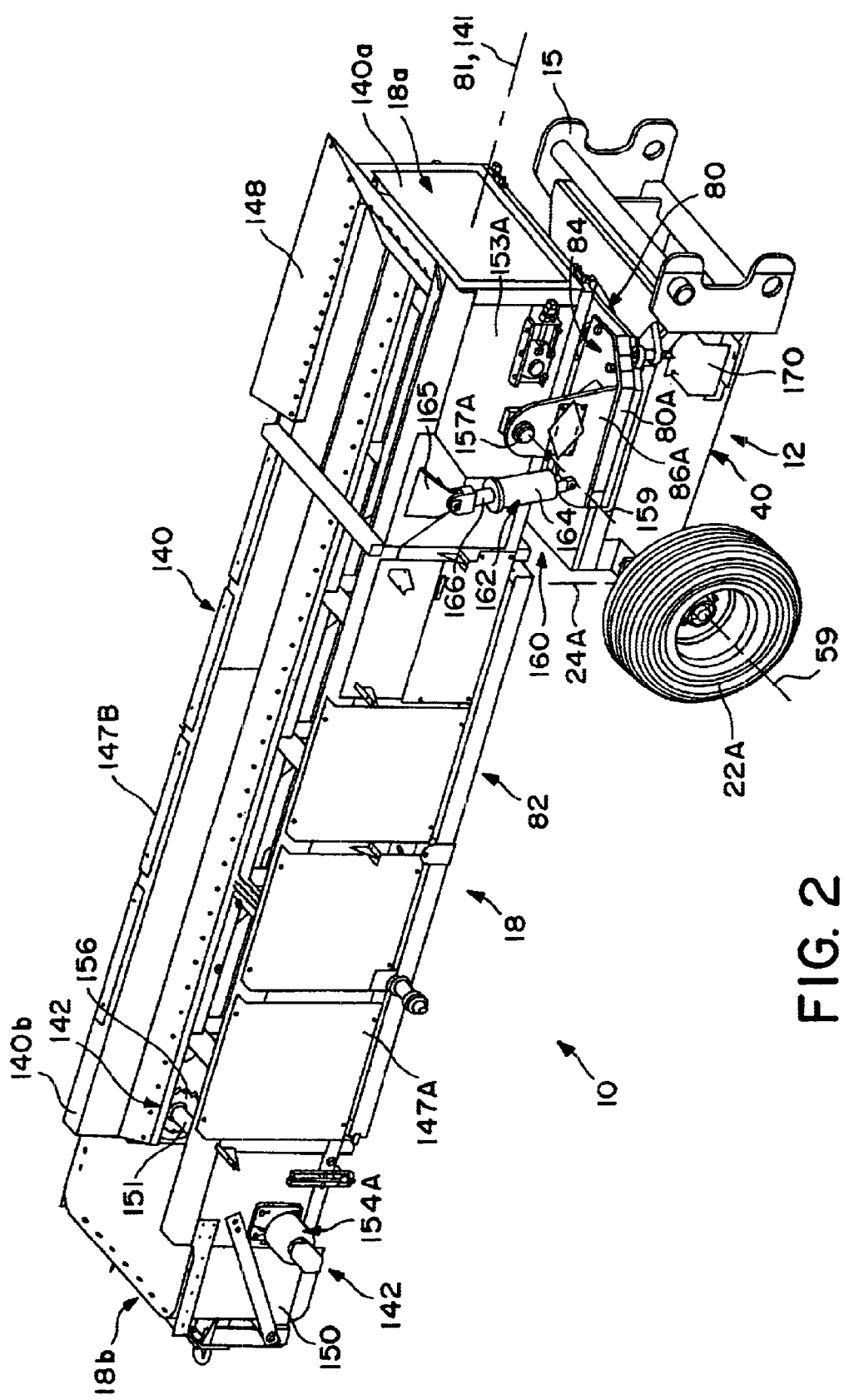
FIG. 2 is a top perspective view, taken from the front, of the mobile conveyor assembly.

Referring to FIGS. 1 and 2, the vehicle 1 preferably includes a mounting linkage 13 attached to the vehicle rear portion 5b that is configured to engage with a mounting frame 15 attached to the carriage 12. The linkage 13 and the frame 15 are preferably constructed as described in detail in co-pending U.S. patent application Ser. No. 09/845,135, which is herein incorporated by reference in its entirety. However, the vehicle 1 and conveyor assembly 10 may include any other appropriate structure(s) for connecting the carriage 12 to the vehicle chassis 6, such as a for example, a simple tow hitch arrangement, as the present disclosure is not directed to such aspects of the mobile conveyor assembly 10.

Referring specifically to FIG. 8, the transfer vehicle 1 preferably further includes a "primary" steering fluid circuit 19 disposed on the chassis 6 and configured to fluidly connect the cylinders 8, 9 of the vehicle steering mechanism 4 with the carriage steering mechanism 26 and to operate the two mechanisms 4 and 26. Also, the fluid circuit 19 is further configured to separately operate the steering mechanism 4 when the conveyor assembly 10, and thus the conveyor steering mechanism 26, is not connected with the vehicle 1. Preferably, the fluid circuit 19 includes a plurality of fluid lines 21A–21J and a plurality of flow-divider valves 23A–23C, preferably 3-port "tee" valves, arranged to direct fluid in a specified manner, as described in detail below. The fluid circuit 19 also includes a reservoir of hydraulic fluid (not shown), one or more hydraulic pumps (not shown) and a pair of rotary steering valves 25A, 25B fluidly connected with the pumps and the fluid reservoir. Each steering valve 25A, 25B includes two ports 27A, 27B and 27C, 27D each connected with a separate fluid line 21G, 21H, 21E and 21J so as to be fluidly connected with the steering cylinders 8, 9, 62 and 63, as described in further detail below. Preferably, the ports 27A, 27B of steering valve 25A are respectively connected with fluid lines 21G and 21H and the ports 27C, 27D of valve 25B are respectively connected with fluid lines 21E and 21J.

Further, the steering valves 25A, 25B are each configured to direct a quantity of fluid to flow out of one port (e.g. 27A) and into the attached fluid line 21"*n*" to thereby initiate fluid flow(s) (and thus actuator movement) throughout the entire fluid circuit 19 (as described in detail below). More specifically, the flow out of either one of the valves 25A, 25B directs fluid flow through the vehicle steering cylinders 8, 9 (and through the carriage steering actuators 62, 63 as discussed below) to displace the cylinder rods 8a, 9a so as to pivot the vehicle wheels 2A–2D about the respective pivot axes 3A–3D. Further, the flow out of one valve port (e.g., 27A) also causes a corresponding quantity of fluid to flow into the valve 25A or 25B through the other port (e.g., 27B). Preferably, the valves 25A, 25B are operationally coupled together such that only one of the two valves 25A, 25B is functional at any given time, the other valve 25B or 25A being fluidly "locked" in a manner known in the fluid control art, as discussed further below. Further, the steering valves 25A, 25B are preferably commercially available rotary valves and most preferably "orbitrol" steering valves 25A, 25B. Alternatively, the steering valves 25A, 25B may each be any other appropriate type of commercially available or specially manufactured steering that is capable of directing fluid flow throughout the primary steering circuit 19 (and also a carriage steering circuit 70, as discussed below) in at least two alternative flow directions.

Referring to FIGS. 1 and 8, the transfer vehicle 1 preferably includes at least one and most preferably two operator stations 29A, 29B each disposed on the a separate lateral side of the chassis 5 and including a separate input device 31A, 31B. Each input device 31A, 31B is configured to operate the connected orbitrol 25A, 25B, respectively, so as to controllably direct fluid flow through associated pair of ports 27A, 27D and 27C, 27D, respectively, as discussed in detail below. Preferably, each input device 31A, 31B is a steering wheel, but may alternatively be provided by any other appropriate input device, such as for example a joystick, a shift lever, a control knob, etc., that is capable of operating the orbitrols or other such steering valves 25A, 25B. Further, the vehicle fluid circuit 19 also preferably includes three fluid couplers 33A–33C each configured to removably connect with a separate fluid line from the conveyor assembly 10, as is also discussed below. Preferably, the three couplers 33A–33C are each a female half of a quick-disconnect coupler device and are all disposed in a manifold block 35 (FIG. 7) located on the vehicle chassis 5 so as to be readily accessible to a vehicle operator.

Figure 7:
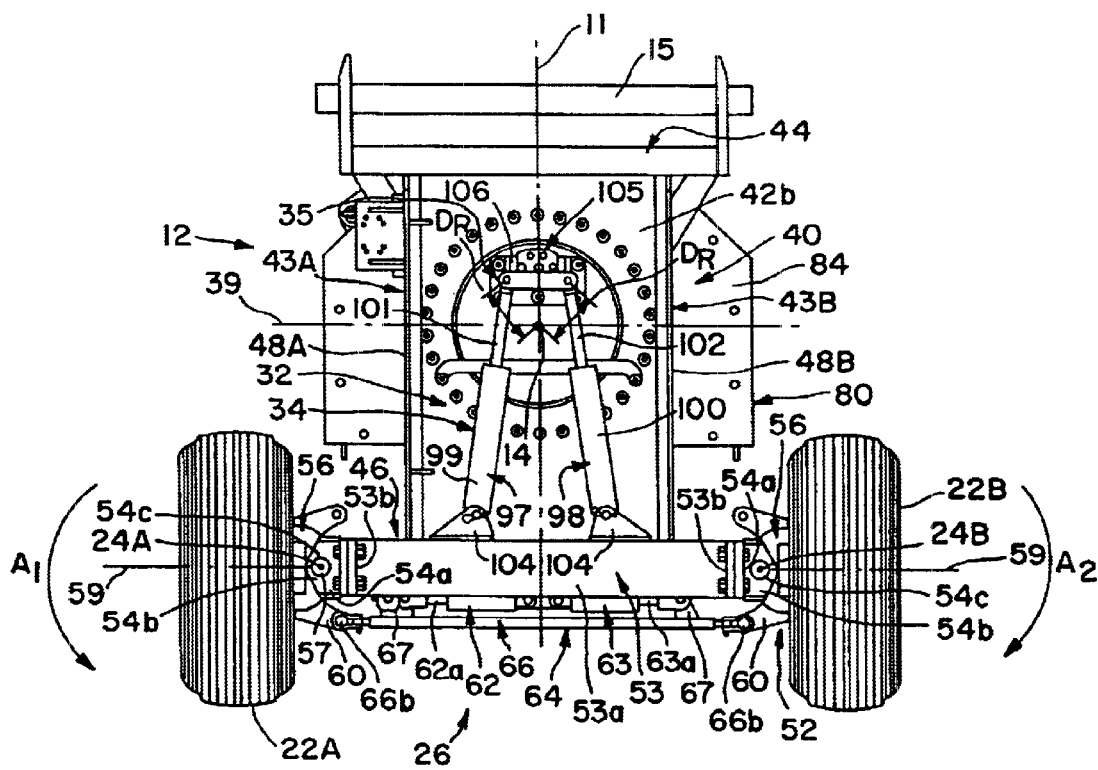
FIG. 7 is a bottom plan view of the mobile conveyor assembly.

Referring now to FIGS. 2–5 and 7, the carriage 12 includes a carriage frame 40 preferably formed as a generally rectangular box having an open lower end and opposing lateral sides 43A, 43B. More specifically, the carriage frame 40 includes an upper, generally horizontal platform wall or platform 42, front and rear vertical walls 44, 46, respectively, and two vertical sidewalls 48A and 48B. The swing axis 14 preferably extends through the platform 42 so as to be generally perpendicular to upper and lower surfaces 42a, 42b, respectively, of the platform 42. As best shown in FIG. 7, the longitudinal centerline 11 of the conveyor assembly 10 extends through the swing axis 14 so as to be generally centered between the frame lateral sides 43A, 43B and a lateral centerline 39 extends generally perpendicularly to the sidewalls 48A, 48B and the longitudinal centerline 11 and through the swing axis 14. Preferably, the lower ends of the four vertical walls 44, 46 and 48A, 48B define a lower opening into a generally hollow space enclosed by the frame 40, inside of which are disposed the primary components of the swing mechanism 32, as described below. Further, a circular opening 45 extends through the platform wall 42 and into the hollow space, the opening being substantially centered on the swing axis 14 and provides clearance for portions of the conveyor swing mechanism 32, as discussed below. Also, the carriage frame 40 preferably further includes a retainer lug 41 mounted to the platform 42 and having a central opening. As discussed below, a pin is inserted through the opening to couple the lug 41 with another retainer lug on the conveyor 18 to "lock" the conveyor 18 at a centered position with respect to the centerline 11.

Figure 5:
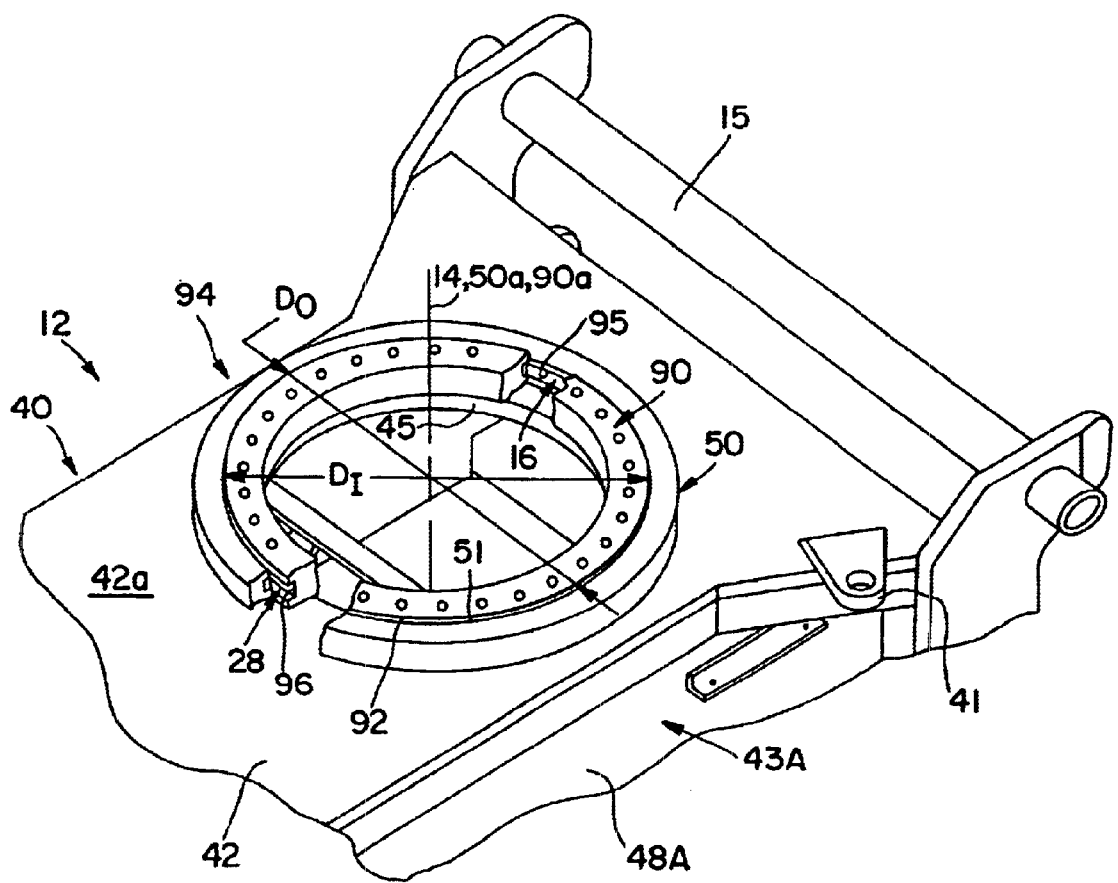
FIG. 5 is an enlarged, broken-away top perspective view, taken from the rear, of a bearing assembly of the conveyor.
Figure 6:
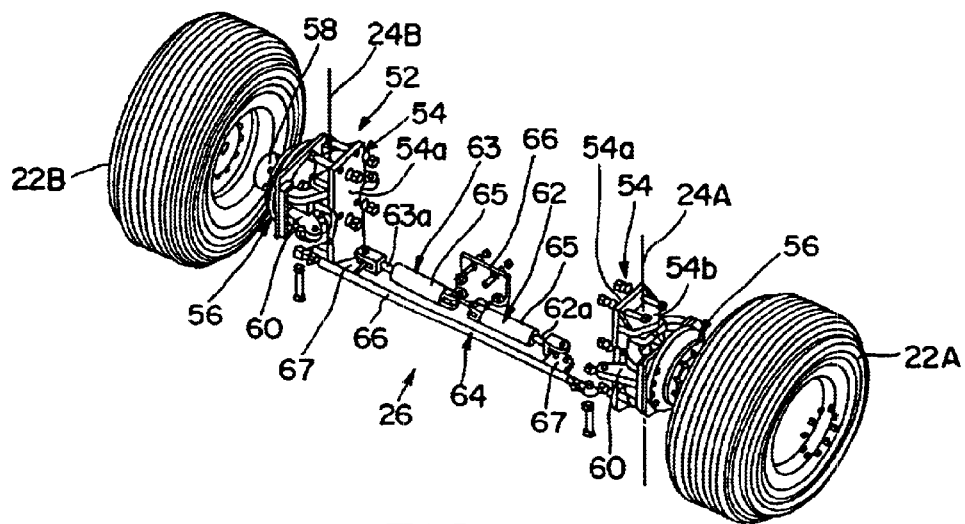
FIG. 6 top perspective view, taken from the rear, of a carriage wheel assembly.

As best shown in FIG. 5, the carriage 12 preferably further includes a generally cylindrical annular body 50 having a central axis 50a and a substantially circular inner circumferential surface 51 substantially centered about the axis 50a. The circumferential surface 51 provides the first bearing surface 16, as discussed above and in further detail below. Preferably, the annular body 50 is disposed on the upper surface 42a of the platform 42 such that the bearing surface 16 is generally centered about the opening 45. In addition, the annular body 50 is preferably removably attached to the platform upper surface 42a by a plurality of threaded fasteners (as shown), but may be removably or fixedly attached to the frame 40 by any appropriate means, for example by weldment material. Further, the annular body 50 may alternatively be at least partially disposed within the platform opening 45 or may be spaced above the upper surface 42a, such as by a spacer plate (neither shown).

Figure 3:
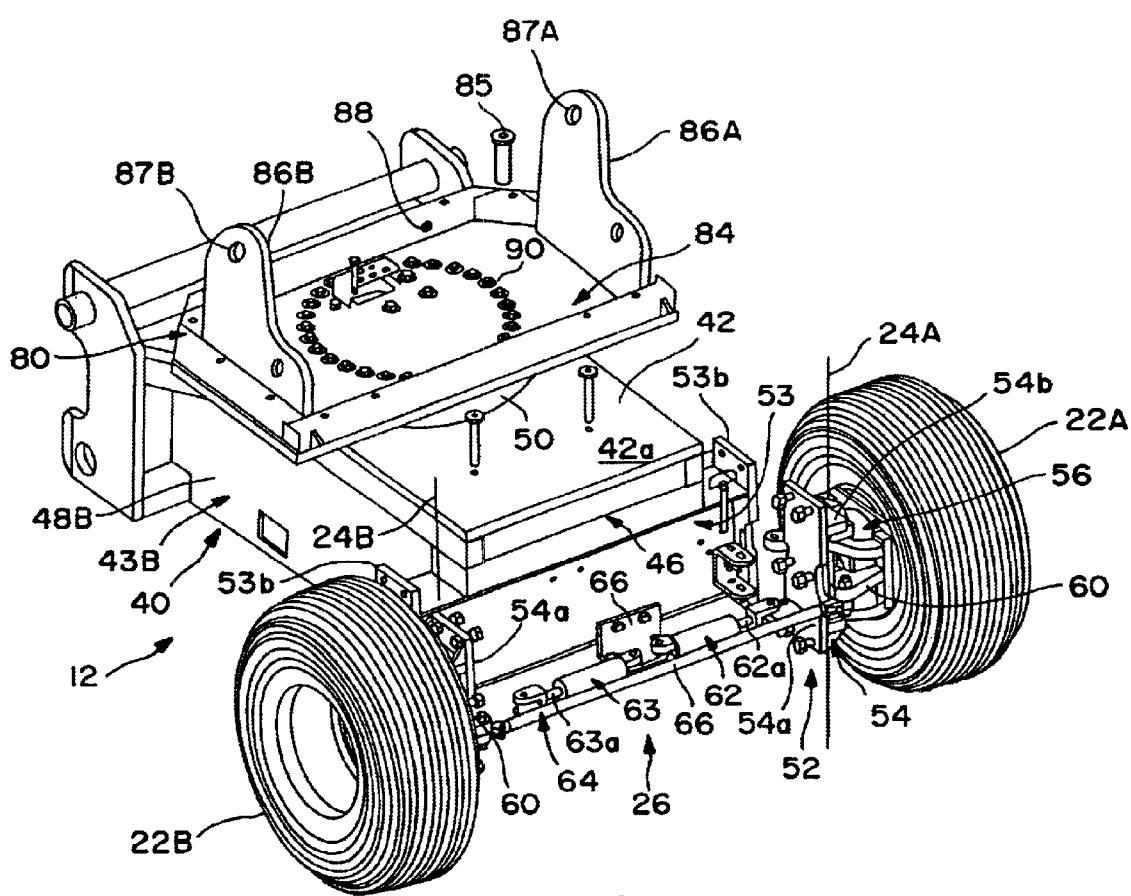
FIG. 3 is a top perspective view, taken from the rear, of a carriage and a portion of a conveyor base frame, shown with a wheel assembly demounted from the carriage.
Figure 4:
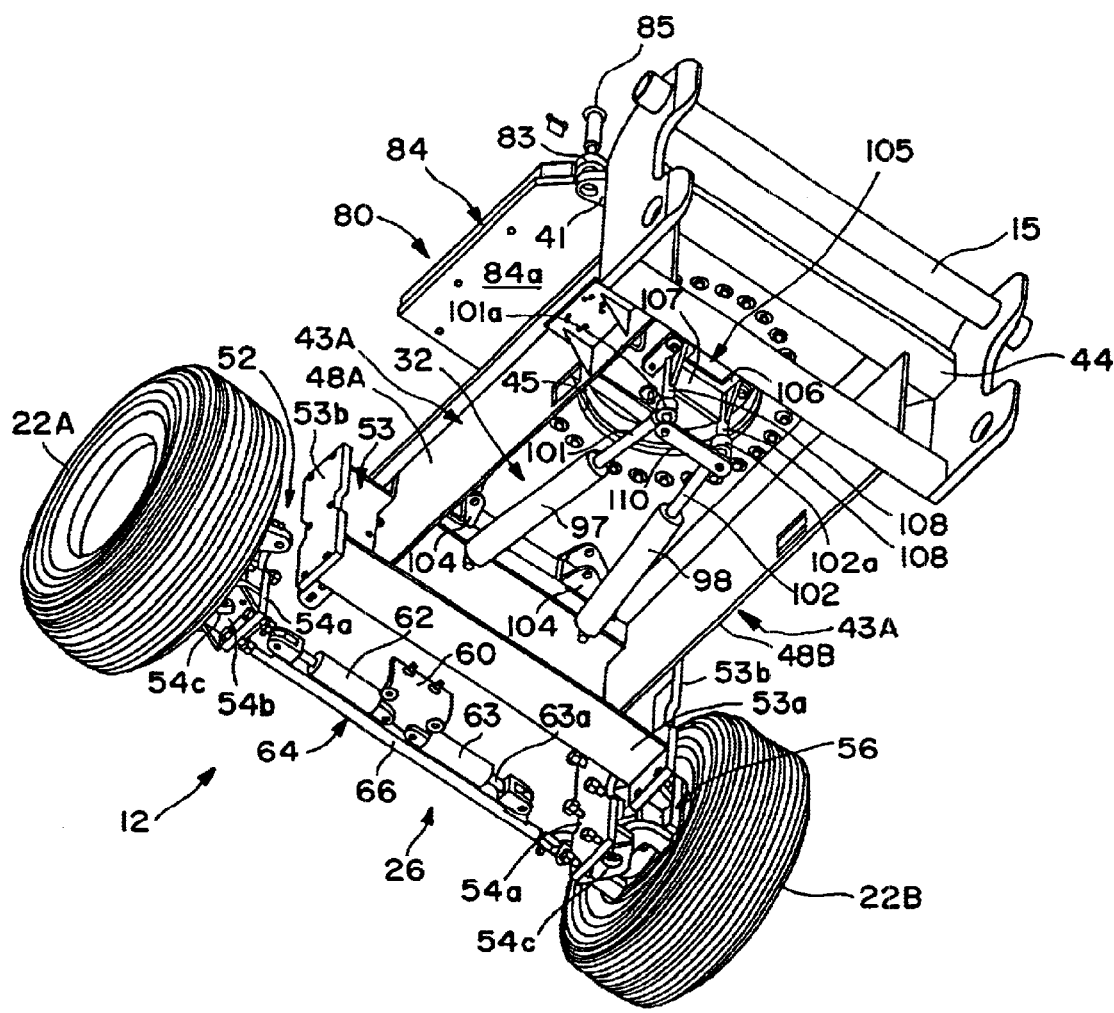
FIG. 4 is a bottom perspective view of the carriage shown in FIG. 3.

Referring now to FIGS. 3, 4, 6 and 7, the carriage 12 preferably includes a wheel assembly 52 including a main support member 53 to which the two carriage wheels 22A, 22B are each movably connected, as described below. Preferably, the main support member 53 is attached to lower sections of the rear vertical edges of the two sidewalls 48A, 48B so as form a lower, main portion of the rear wall 46 of the frame 40, as best shown in FIGS. 3 and 4, but may alternatively be provided by a separate member (not shown) attached to the rear wall 46. Further, the support member 53 is preferably formed of an I-beam 53a and two vertical end plates 53b each attached to a separate opposing end of the beam 53a. Two bearing brackets 54 are each attached to a separate one of the end plates 53b and each includes a vertical base plate 54a and two vertically spaced-apart bearing plates 54b. Each bearing plate 54b has a bearing hole 54c (FIG. 7) aligned with the hole 54c of the other plate 54b. Further, a separate hub assembly 56 is pivotally mounted to each bearing bracket 54 by means of a vertical pin shaft 57 disposed through the two aligned bearing holes 54c. Each hub assembly 56 includes a generally horizontal stub shaft 58 (one shown—FIG. 6) configured to removably mount a separate one of the conveyor carriage wheels 22A or 22B to the frame 40 and a steering arm 60 connectable with the carriage steering mechanism 26, as discussed in further detail below.

With this structure, the pivot axis 24A, 24B of each carriage wheel 22A, 22B, respectively, extends longitudinally through the proximal or associated vertical pin shaft 57. More specifically, the second carriage wheel pivot axis 24B is spaced horizontally from and extends generally parallel with the first carriage wheel pivot axis 24A. Further, each wheel 22A, 22B is mounted to a separate one of the stub shafts 58 so as to be rotatable about a roll axis 59 (FIG. 7) extending generally horizontally through each shaft 58. Further, each roll axis 59 extends generally perpendicularly to the associated carriage wheel pivot axis 24 such that the wheels 22A, 22B are each rollable upon a surface S (FIG. 1), such as a roadbed, to mobilize the carriage 12, and thus the entire conveyor assembly 10 of the present invention.

Referring now to FIGS. 2–8, the carriage steering mechanism 26 includes at least one and preferably two linear actuators, most preferably two hydraulic "steering" cylinders 62 and 63. The cylinders 62 and 63 each has a separate rod 62a, 63a, respectively, connected with the two carriage wheels 22A, 22B, preferably through a steering linkage 64 (described below). Each cylinder 62, 63 further includes a cylinder body 65, both bodies 65 being pivotally attached to a common mounting bracket 66 so as to connect the two cylinders 62, 63 to the carriage 12. Preferably, the steering cylinders 62 and 63 are each constructed or configured to allow oil to pass from the cylinder 62 or 63 after the rod 62a, 63a, respectively, is "fully stroked", which allows the cylinders 62, 63 to compensate for fluid losses in the connected fluid circuits 19 and 70 (as described above and in further detail below) in order to ensure that a sufficient volume of fluid enters a fluidly connected cylinder, as described in detail below. Further, the two cylinders 62, 63 are arranged end-to-end with respect to the carriage 12 such that the two cylinder rods 62a, 63a extend generally horizontally in opposing directions and each extends outwardly from the associated body 65 generally toward the proximal carriage frame sidewall 48A, 48B, respectively. The steering linkage 64 mechanically couples or connects the two steering cylinders 62 and 63 such that the two rods 62a, 63a move generally simultaneously and in opposing linear directions, in other words, one rod (e.g., 62a) extends as the other rod (i.e., 63a) retracts. Furthermore, although two cylinders 62 and 63 are preferred, the carriage steering mechanism 26 may alternatively include only a single cylinder 62' (FIG. 9) connected with both of the wheels 22A, 22B through a linkage 64 (described below) and/or may include a rotary actuator(s), such as for example an electric or hydraulic motor (none shown).

Preferably, the steering linkage 64 includes a steering rod 66 pivotally attached with each of the two hydraulic cylinders 62, 63 by means of a separate one of two attachment plates 67, each plate 67 being attached with each rod end 63a and an interior portion (i.e., spaced inwardly from its ends) of the steering rod 66. The steering rod 66 is further connected with the two carriage wheels 22 through the two steering arms 60. Preferably, the steering rod 66 is formed of an elongated circular-cylindrical bar having opposing ends 66a, 66b and is disposed so as to extend generally horizontally along the front of the support member 53. Each end 66a, 66b of the rod 66 is pivotally attached to a separate, proximal one of the steering arms 60. Thus, the steering linkage 64 is generally formed of the two attachment plates 67, the steering rod 66, and the two steering arms 60.

With the above structure, the steering linkage 64 functions to convert linear displacement (i.e., extension or retraction)

of the two cylinder rods 62a, 63a into angular or pivotal displacement of the carriage wheels 22A, 22B in the following manner. As discussed in further detail below, the two cylinders 62, 63 are fluidly interconnected (and connected with the vehicle cylinders 8 and 9) such that as one rod (e.g., 62a) extends by a distance $D_1$, the other rod (i.e., 63a) retracts by a substantially equal distance $D_2$, as indicated in FIG. 8. Further, each rod 62a, 63a moves in the same horizontal direction generally toward one lateral side 43A or 43B of the carriage 12 so as to cause a corresponding horizontal, linear displacement of the steering rod 66 with respect to the base 12. The linear displacement of the steering rod 66 causes the two steering arms 60 separately attached to each rod end 66a, 66b to pivot about the associated pivot axis 24A, 24B in the same angular direction $A_1$ or $A_2$. Furthermore, the pivoting of the two steering arms 60 thereby pivots each connected hub assembly 56 and the carriage wheel 22A, 22B mounted thereto in the same angular direction $A_1$ or $A_2$ about the associated axis 24A, 24B, respectively.

Referring specifically to FIG. 8, the carriage 12 preferably further includes a steering fluid circuit portion or circuit 70 fluidly connecting the two carriage steering cylinders 62, 63 into the primary fluid circuit 19 on the transfer vehicle 1. More specifically, the carriage steering circuit 70 is configured to fluidly connect the two chambers of each cylinder 62, 63 with a separate one of the three fluid couplers 33A–33C of the primary fluid circuit 19. Thus, the fluid circuit 70 removably connects the carriage steering cylinders 62 and 63 with the vehicle steering cylinders 8 and 9 and with the orbitrols 25A and 25B, as discussed in further detail below. Preferably, the carriage circuit 70 includes five fluid lines 71A–71E, a flow divider valve 73 interconnecting three of the fluid lines 71C, 71D and 71E (as discussed below) and three fluid couplers 72A–72C each attached to the outer end of a separate one of three of the fluid lines 71A, 71B and 71C, respectively. Preferably, the flow divider valve 73 is a 3-port tee valve 73 that merges flow from two lines 71D and 71E into line 71C and alternately divides flow from the line 71C between lines 71D and 71E, as discussed below. Further, the fluid couplers 72A–72C are each configured to removably attach to a separate one of the three fluid couplers 33A, 33B and 33C, respectively, on the vehicle 1 to thereby removably connect the carriage steering fluid circuit 70 into the primary steering fluid circuit 19. Preferably, each coupler 72A–72C is formed as a male half of a quick-disconnect coupler device configured to mate with the preferred female couplers 33A–33C, but may be constructed in any other appropriate manner.

Still referring to FIG. 8, the interconnected fluid circuits 19 and 70 are preferably configured or constructed such that, when the vehicle steering cylinder rods 8a, 9a each displace by a first distance $D_V$, the carriage steering cylinder rods 62a, 63a each displace by a second distance $D_C$, the second distance $D_C$ being generally equal to the first distance $D_V$, as described in detail below. As such, the magnitude of the angular displacement $\theta_1$ of each carriage wheel 22A, 2B is generally equal to a magnitude of the angular displacement $\theta_2$ Of each vehicle wheel 2A–2D (see FIG. 9), also as discussed in greater detail below. Further, the four cylinders 8, 9, 62 and 63 are preferably fluidly or hydraulically connected in an arrangement referred to as "rephasing" in the fluid control art, in the following manner. In the rephasing arrangement, one vehicle cylinder, preferably left cylinder 8, and one carriage cylinder, preferably right cylinder 62, are each configured as a "master" cylinder and the other vehicle and carriage cylinders 9 and 63, respectively, are each configured as a "slave" cylinder. The master cylinders 8 and 62 are each sized larger than the two slave cylinders 9 and 63; more specifically, the rod chambers 8b, 62b and the base chambers 8c, 62c of the two master cylinders 8 and 62, respectively, each have a greater maximum interior volume (and thus fluid capacity) than each corresponding rod chamber 9b, 63b and base chamber 9c, 63c of the two slave cylinders 9, 63.

Furthermore, the interconnection of the four steering cylinders 8, 9, 62 and 63 is configured such that each master cylinder 8 and 62 causes extension of the fluidly connected slave cylinder 63, 9, respectively, and each slave cylinder 63 and 9 causes retraction of the fluidly connected master cylinder 8, 62, respectively, as discussed in detail below. Also, each carriage steering cylinder 62, 63 is preferably directly fluidly connectable with the vehicle steering cylinder 9, 8, respectively, located on the same side of the conveyor assembly centerline 11, which is also more fully described below. As used throughout the present disclosure, the phrase "directly fluidly connected", and similar phrases, are each intended to describe the arrangement where fluid flow entering or exiting one cylinder chamber causes a substantially equal volume of fluid to flow out of or into, respectively, the connected chamber of the other cylinder.

Still referring to FIG. 8, when the carriage fluid circuit 70 is connected with the vehicle fluid circuit 19, the four steering cylinders 8, 9, 62 and 63 are fluidly connected or interconnected in the following preferred manner. The rod chamber 8b, 62b of each master cylinder 8 and 62, respectively, is directly fluidly connected with the respective base chamber 63c and 9c of the associated slave cylinder 63 and 9, respectively. Further, the base chamber 8c, 62c of each master cylinder 8 and 62, respectively, and the rod chamber 9c, 63c of the particular slave cylinder 9 and 63, respectively, that is mechanically connected (i.e., by the steering linkages 17 and 64) with each master cylinder 8 or 62, respectively, are fluidly connected with the orbitrols 25A, 25B, through a series of common or shared fluid lines. More specifically, a fluid line 71D extending from the carriage master base chamber 62c and a fluid line 71E extending the carriage slave rod chamber 63b are both connected with a flow-divider valve 73 disposed on the carriage 12. A shared fluid line 71C extends from the divider valve 73 and is connected with the two orbitrols 25A, 25B through the connected coupler pairs 72C/33C, fluid line 21J, valve 23C and then respectively to orbitrol 25A through line 21H and to orbitrol 25B through line 21I. Further, a fluid line 21C extends from the vehicle master base chamber 8c to one flow divider valve 23A and a fluid line 21B extends from the vehicle slave rod chamber 9b to another divider valve 23B, the two valves 23A, 23B being fluidly connected together and with the orbitrols 25A, 25B through shared fluid lines 21E, 21F and 21G.

Furthermore, the four steering cylinders 8, 9, 62 and 63 are relatively sized such the fluid capacity of each master cylinder rod chamber 8b, 62b is substantially equal to the fluid capacity of the fluidly connected slave cylinder base chamber 63c, 9c, respectively. Although the rod chambers 8b, 62b of the master cylinders 8, 62 each have a greater interior volume, as measured without accounting for the piston rods 8a, 62a, than the interior volume of the associated slave cylinder base chamber 63c, 9c, respectively, the presence of the piston rods 8a, 62a within the chambers 8b, 62b, respectively, reduces the volume available to receive or contain fluid to about the volume of the slave base chambers 63c, 9c. As such, a quantity of fluid flowing between fluidly connected chambers 8b and 63c or chambers 62b and 9c causes substantially equal displacements of the respective cylinder rods 8a, 63a and 62a, 9a of each of the two pairs of connected cylinders 8 and 63 and cylinders 62 and 9. In other words, the displacement of the master cylinder rods 8a, 62a caused by fluid entering or exiting each master rod chamber 8b and 62b is substantially equal to, but in an opposite "direction" (i.e., retraction or extension) than, the displacement of the slave cylinder rods 63a, 9a caused by the associated flow respectively exiting or entering the slave base chambers 63c and 9c.

With the mechanical and fluid interconnection of the four steering cylinders 8, 9, 62 and 63, the four rods 8a, 9a, 62a and 63a of all the cylinders 8, 9, 62 and 63, respectively, move generally simultaneously and each displaces a substantially equal distance. More specifically, the two vehicle steering cylinders 8 and 9 are mechanically coupled/connected together by the vehicle steering linkage 17 and the two carriage steering cylinders 62 and 63 are mechanically connected together by the carriage steering linkage 64, each cylinder pair 8, 9 and 62, 63 being arranged such that the two rods of each connected pair of rods, rods 8a and 9a and rods 62a and 63a, each move in opposing directions. Further, each steering cylinder 8 and 9 on the vehicle 1 and each steering cylinder 62 and 63 on the carriage 12 is fluidly connected in the described master-slave arrangement to a cylinder 63, 62, 9 and 8, respectively, on the other "vehicle" 12 or 1, respectively.

With the above-described configuration of the steering circuits 17 and 70, the vehicle wheel pairs 2A, 2B and 2C, 2D and the two carriage wheels 22A, 22B are pivoted or steered in the following manner. When a vehicle operator desires to turn the vehicle 1 toward either the rightward direction R or the leftward direction L, the operator rotates the steering wheel 31A, 31B of whichever operator station 29A or 29B that the operator is located in the desired direction R or L. Rotation of the steering wheel 31A or 31B causes the connected orbitrol 25A, 25B, respectively, to rotate in an appropriate direction to initiate fluid flow through the two connected fluid circuits 19 and 70 such that the vehicle wheel pairs 2A, 2B and 2C, 2D, 22A and 22B are turned in the desired direction, while the carriage wheels 22A, 22B are turned in the opposite direction, as follows.

For example, if an operator located in the right operator station 29A desires to turn the vehicle 1 toward the rightward direction R, the operator turns the steering wheel 31A to the right or clockwise, causing the orbitrol 25A to direct a quantity of fluid to flow through the second port 27B and into the fluid line 21H. The fluid flows through the flow-divider valve 23C and entirely into the fluid line 21J, since the associated line 21I is essentially blocked by the locked orbitrol 25B, and then flows through the connected couplers 33C/72C, through fluid line 71C and into flow divider valve 73. The fluid entering the divider valve 73 is then split between lines 71D and 71E. Fluid flowing into line 71D flows into the base chamber 62c of the carriage master cylinder 62, causing the master rod 62a to extend and forcing fluid to flow from the rod chamber 62b and into line 71A. At the same time, fluid flowing into line 71E flows into the rod chamber 9a of the carriage slave cylinder 63, causing the slave rod 63a to retract and force a quantity of fluid to flow from the base chamber 63c and into line 71B. The extension of the master cylinder rod 62a and retraction of the slave cylinder rod 63a causes the steering linkage 64 to pivot the carriage wheels 22A, 22B toward the leftward direction L.

Generally simultaneously, the fluid flowing into line 71A from the carriage master cylinder rod chamber 62b flows through connected couplers 72A/33A, through line 21A and into the base chamber 9c of the vehicle slave cylinder 9, causing the piston rod 9a to extend and forcing fluid to flow out of the rod chamber 9b and into line 21B. At the same time, fluid flowing into line 71B from the carriage slave cylinder base chamber 63c flows through connected couplers 72B/33B, through line 21D and into the rod chamber 8c of the vehicle master cylinder 8, causing the piston rod 8a to retract and forcing fluid out of the base chamber 8c and into line 21C. The extension of the slave cylinder piston 9a and the retraction of the master cylinder rod 8a cause the steering linkage 17 to pivot the vehicle wheels 2A, 2B toward the leftward direction L. Finally, the fluid flowing out of the vehicle master cylinder 8 flows from line 21C, through divider valve 23B and through line 21F and into divider valve 23A, joining with flow from line 21B out of the vehicle slave cylinder 9, the combined flows entering the orbitrol 25A through the first valve port 27A.

If instead the operator (still located in the first operator station 29A) desires to turn the vehicle 1 toward the leftward direction L, the operator turns the steering wheel 31A toward the left or counterclockwise, causing the connected orbitrol 25A to direct a quantity of fluid through the first port 27A and into fluid line 21G. Fluid then flows through the flow-divider valve 23A and is split between lines 21B and 21F. Fluid flowing into line 21B flows into the rod chamber 9a of the vehicle slave cylinder 9, causing the piston rod 9a to retract and force a quantity of fluid to flow from the base chamber 9c and into line 21A. At the same time, fluid flowing into line 21F flows through the second divider valve 23B and entirely into line 21C (the left orbitrol 25B being locked by activation of the right orbitrol 25A so that fluid does not enter line 21E) and thereafter into the base chamber 8a of the vehicle master cylinder 8, causing the piston rod 8a to extend and forcing fluid to flow from the rod chamber 8b and into line 21D. The extension of the master cylinder piston rod 8a and retraction of the slave cylinder piston rod 9a causes the steering linkage 17 to pivot the two vehicle wheel pairs 2A, 2B and 2C, 2D in the rightward direction R.

Generally simultaneously, the fluid flowing into line 21A from the vehicle slave cylinder 9 flows through connected fluid couplers 33A/72A into line 71A and into the rod chamber 62b of the carriage master cylinder 62, causing the piston rod 62a to retract and forcing fluid to flow out of the base chamber 62c and into line 71D. At the same time, fluid flowing into line 21D from the vehicle master cylinder 8 flows through connected couplers 33B/72B, into line 71B and into base chamber 63c of the carriage slave cylinder 63, causing the piston rod 63a to extend and forcing fluid out of the rod chamber 63b and into line 71E. The retraction of the master cylinder piston rod 62a and the extension of the slave cylinder 63a cause the steering linkage 64 to pivot the carriage wheels 22A, 22D toward the rightward direction, i.e., in a direction opposite the turning direction of the vehicle wheels 2A, 2B, 2C and 2D. Finally, the fluid flowing out of the carriage cylinders 62 and 63 flows from lines 71D and 71E, respectively, into the flow-divider valve 73, and thereafter through the common line 71C, through connected couplers 72C/33C, into valve 23C, through line 21H and into the second port 27B of the orbitrol 25A.

Although the above-descriptions for a rightward turn and leftward turn detail the flow of fluid as occurring in a sequential manner, the separate fluid flows occur rapidly and generally simultaneously, i.e., fluid flow into one chamber begins as soon as fluid flows out of a fluidly connected chamber. As such, there is preferably no discernible delay between the movement of the four rods 8a, 9a, 62a and 63b of the four cylinders 8, 9, 62 and 63, respectively, and thus the vehicle wheel pairs 2A and 2B and the carriage wheels 22A, 22B all turn generally simultaneously. Further, the above detailed description of the steering operation performed from the right operator station 29A is generally applicable to understanding steering the vehicle 1 and carriage 12 from the left operator station 29B, in which latter case the orbitrol 25B directs fluid flow throughout the connected fluid circuits 19 and 70 and the right orbitrol 25A is "locked", as discussed above. As a person skilled in the fluid control art will readily understand the specific details of a steering operation performed with the left steering wheel 31B from the above description, a detailed description of the fluid flows through the steering circuits 19 and 70 as driven by the left orbitrol 25B is therefore unnecessary and not presented herein.

Further, although the vehicle steering mechanism 4 and the conveyor steering mechanism 26 include the four hydraulic cylinders 8, 9, 62 and 63 that are operably interconnected by fluid control circuits 19 and 70, the scope of the present invention includes any other appropriate types of actuators and control circuits configured to cause the carriage wheels 22A–22D to rotatably displace in one direction when the vehicle wheels 22A and 22B displace or turn in an opposing direction. For example, either or both of the steering mechanisms 4 and 26 may include one or more electric motors, hydraulic motors and/or pneumatic motors mechanically connected with the steering linkages 17 or 64 and operatively connected together by an appropriate control circuit. More specifically, the vehicle and carriage steering mechanisms 4 and 26, respectively, may each include a separate electric motor (none shown) each connected with the associated steering linkage 17 and 40, for example each including a rack gear (none shown), and connected by an electric control circuit (not shown) configured to cause the motors to turn the vehicle wheel pairs 2A, 2B and the carriage wheels 22A, 22B in opposing directions. The present invention includes these and all other appropriate structures for the vehicle and carriage steering mechanisms 4 and 26, respectively, that function to steer the carriage wheels 22A, 22B in response to the steering of the vehicle wheel pairs 2A, 2B and 2C, 2D.

Referring to FIGS. 1–3, 5 and 14, the conveyor 18 preferably includes two main components: a generally U-shaped base frame 80 rotatably connected with the carriage 12 and a generally rectangular conveyor body 82 pivotally connected with the base frame 80 and through which extends the conveyor centerline 81. The base frame 80 is rotatably displaceable with respect to the carriage 12 about the swing axis 14 so as to vary or adjust a horizontal angular position (indicated by angle α) of the centerline 81 with respect to the conveyor assembly centerline 11. More specifically, the swing actuator 34 is configured to angularly displace the conveyor 18 about the swing axis 14 so as to move the conveyor centerline 81 between a first maximum angular position with respect to the carriage centerline 11, where α=90° on the left side of centerline 11 (FIG. 12), and a second maximum angular position with respect to centerline 11, where α=90° on the right side of centerline 11 (not shown). As such, the angular displacement of the conveyor 18 between the first and second positions linearly displaces the conveyor discharge end 18b between a first or left "limit" position to and a second or right limit position, and to any and all positions therebetween. Further, with the first angular position and the second angular position being spaced apart by about 180° as described, the conveyer centerline 81 extends in a first or Leftward direction in the first angular position and a generally opposing second or Rightward direction in the second angular position, such that the conveyor 18 is able to transport material to a paver (not shown) located anywhere within a semicircle about the rear of the conveyor assembly 10, as discussed below.

Preferably, the base frame 80 includes a generally horizontal bottom wall or "turntable" 84 and two generally vertical sidewalls or "yoke" walls 86A, 86B each extending upwardly from opposing sides of the turntable 84. The three frame walls 84, 86A and 86B form a yoke-like or clevis-like structure with an opening 88 configured to receive a lower portion of the conveyor body 82, as discussed in further detail below. Further, the turntable 84 includes a retainer lug 83 having an opening alignable with the opening in the carriage retainer lug 41, such that a retainer pin 85 inserted through the lugs 41, 83 (FIG. 4) maintains the conveyor 18 at a centered position (discussed below) with respect to the assembly centerline 11. Also, each yoke wall 86A, 86B includes a bearing opening 87A, 87B, respectively, configured to receive a separate stub shaft of the conveyor body 82 so as to pivotally attach the body 82 to the base frame 80, as described below.

Referring to FIGS. 3–5, the conveyor 18 further includes a generally cylindrical annular body 90 connected to a lower surface 84a of the turntable 84. The annular body 90 has a central axis 90a and a substantially circular outer circumferential surface 92 substantially centered about the axis 90a and providing the second bearing surface 28. Further, the "second" annular body 90 on the conveyor base frame 80 is configured to engage with the above-described "first" annular body 50 on the carriage 12. More specifically, the second annular body 90 has an outside diameter $D_O$ sized slightly smaller or lesser than the inside diameter $D_I$ of the first annular body 50. With this structure, the second annular body 90 is slidably disposable within the first annular body 50, such that the first body axis 50a is substantially collinear with the second body axis 90a, thereby rotatably connecting the conveyor 18 with the carriage 12. The two connected annular bodies 50 and 90 form a rotary bearing assembly 94 that provides the swing axis 14, i.e., the swing axis 14 is defined by the collinear axes 50a and 90a, and functions to facilitate rotation of the conveyor 18 with respect to the carriage 12, specifically about the swing axis 14.

Still referring to FIG. 5, the bearing assembly 94 is preferably a rolling contact or anti-friction type bearing that further includes a plurality of rolling elements (not shown), such as balls or rollers, disposed between the two annular bodies 50 and 90. More specifically, the first bearing surface 16 provides an outer bearing race 95 and the second bearing surface 28 provides an inner bearing race 96, the rolling elements (none shown) being disposed between the bearing races and spaced circumferentially about the conveyor swing axis 14. Alternatively, the bearing assembly 94 may be constructed as a journal bearing or a fluid film bearing, and thus without any rolling elements, in which case the first and second bearing surfaces 16, 28 slide against each other or against a film of lubrication. As such types of bearings are well known, further description of the bearing assembly 94 is unnecessary to fully appreciate the present invention, and is therefore beyond the scope of the present disclosure.

Although the above-described bearing structure is preferred, the conveyor 18 may be connected with the carriage 12 by any other appropriate means. For example, the second annular body 90 may be sized having an inside diameter that is slightly larger than the outside diameter of the first annular body 50, such that the first body 50 is slidably disposable within the second body 90 (structure not shown). In such an arrangement, the first bearing surface 16 is provided by an outside circumferential surface (not indicated) of the first annular body 50 and the second bearing surface 28 is provided by an inside circumferential surface (not indicated) of the second annular body 90. Further for example, the two bearing surfaces 16 and 28 may be provided by annular wall sections (none shown) that are integrally formed with the platform wall 42 of the carriage 12 and the turntable 84 of the conveyor base frame 80, as opposed to the separate annular bodies 50, 90 attached to the carriage 12 and the conveyor 18. The scope of the present invention includes these and all other appropriate alternative structures for rotatably connecting the conveyor 18 with the carriage 12.

Referring now to FIGS. 4, 7 and 11–13, the conveyor swing mechanism 32 preferably includes two of the above-described actuators 34 each directly connected with the carriage 12. Further, the swing mechanism 32 also preferably includes a crank 105 connected with the conveyor 18 and with the two actuators 34, as described below. Preferably, the two actuators 34 are first and second hydraulic cylinders 97 and 98, respectively, each including a cylinder body 99, 100, respectively, and a rod 101, 102, respectively. The cylinder bodies 99, 100 are each preferably pivotally connected with an inner surface 46a of the carriage frame rear wall 46 by means of a separate one of two spaced apart, U-shaped brackets 104. Further, the rod 101, 102 of each respective cylinder 97 and 98 has a free end 101a, 102a, respectively, pivotally attached to the crank 105 so as to movably connect (in combination with the bearing assembly 94) the base frame 80, and thus the conveyor 18, to the carriage 12. Furthermore, when the cylinders 97, 98 are so arranged, the two rods 101, 102 are generally disposed in a common, generally horizontal plane (not indicated).

Referring particularly to FIG. 4, the crank 105 is preferably formed of a generally rectangular base plate 106 attached to the base frame 80, a pair of spaced-apart crankpins 108 projecting vertically downwardly from the base plate 106 and a reinforcing plate 107 extending between the crankpins 108. The base plate 106 is fastened to the lower surface 84a of the turntable 84 by appropriate means (e.g., bolts) so as to attach the crank 105 to the conveyor base frame 80. Further, the free end 101a, 102a of each actuator rod 101, 102, respectively, is pivotally attached to a separate one of the crankpins 108 so as to connect the cylinders 97, 98 to the crank 105. Furthermore, a support link 110 is attached to the free end of each crankpin 108 so as to extend between and rigidly connect the two rod/crankpin assemblies 101/108 and 102/108.

Figure 11:
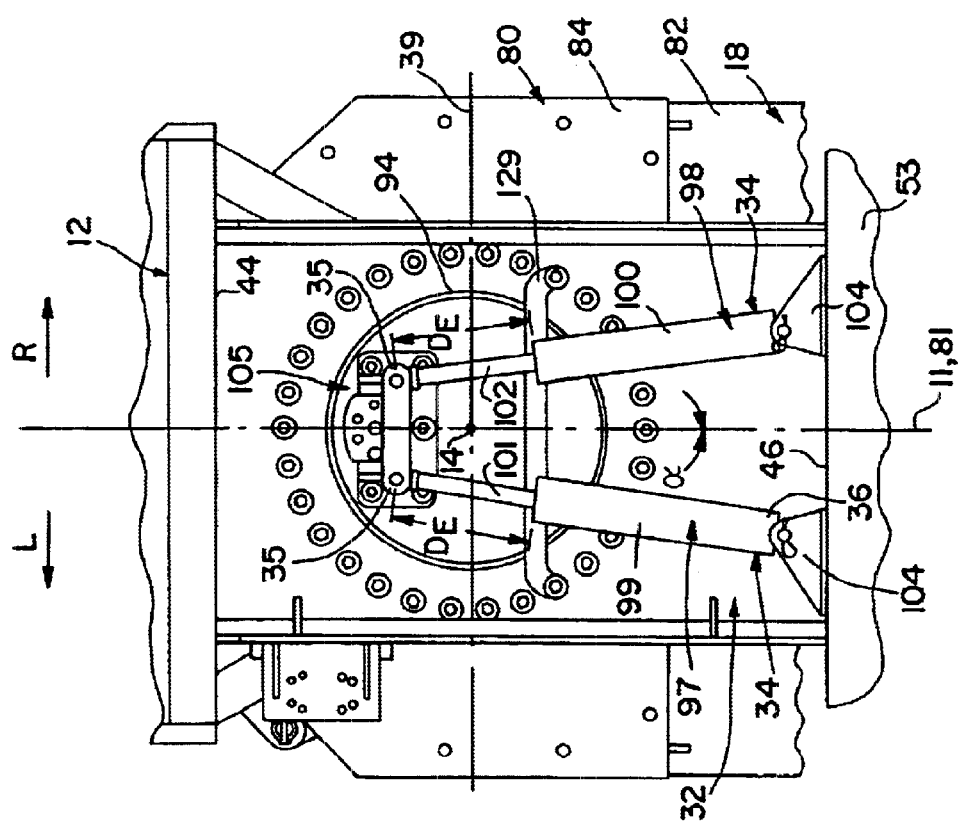
FIG. 11 is an enlarged, partially broken-away bottom plan view of the mobile conveyor assembly, showing a conveyor swing assembly in a first, "Centered" position.

Referring to FIGS. 5, 7 and 11–13, the above-described bearing assembly 94 restricts the movement of the turntable 84 to rotational or angular displacement about the swing axis 14 as the attached annular body 90 slidably displaces against the first annular body 50 along the first arcuate path $P_1$, as discussed above. Since the crank 105 is attached to the turntable 84, the crank 105 is also constrained to rotate along an arcuate path(es) centered about the swing axis 14 (FIG. 13). Preferably, the crank 105 is positioned on the turntable lower surface 84a such that each crankpin 108, and thus also the attached cylinder rod end 101a or 102a, is spaced a substantially equal radial distance $D_R$ from the conveyor swing axis 14, as indicated in FIG. 7. As such, the ends 101a, 102a of the two cylinder rods 101, 102, respectively, are each configured to displace along arcuate pathes $P_1$, $P_2$, respectively, each having a separate radius $R_1$ and $R_2$, respectively, that are substantially equal and equal to the radial distance $D_R$. Thus, the two arcuate paths $P_1$, $P_2$ lie on a common circumference about the swing axis 14 (see FIG. 13). In addition, the crank 105 is also preferably arranged so as to extend generally perpendicularly across, and be generally centered on, the conveyor body centerline 81. With this arrangement, when the conveyor body 82 is at a zero swing ($\alpha=0$) or "Centered" position in which the conveyor body centerline 81 is generally horizontally aligned with (but spaced above) the conveyor assembly centerline 11, the crank 105 is generally centered across the assembly centerline 11, as shown in FIG. 11.

Further, the first and second swing cylinders 97, 98, respectively, are arranged on the carriage 12 such that when the crank 105 is in the Centered position shown in FIG. 11, each cylinder rod 101, 102 is extended an equal distance $D_E$ (FIG. 11) with respect to the associated cylinder body 99, 100, respectively, and the crank 105 and the cylinder bodies 99, 100 are disposed on opposing sides of the lateral centerline 39. With the relative geometrical arrangement between the two cylinders 97, 98, the crank 105 and the conveyor body centerline 81 as described above, the cylinders 97, 98 are able to rotate the crank member 105, and thus the conveyor 18, through a total arc of movement or angular displacement of at least 180° about the swing axis 14, and specifically of at least 90° to each side of the longitudinal centerline 11, as described above and in detail below.

Figure 10:
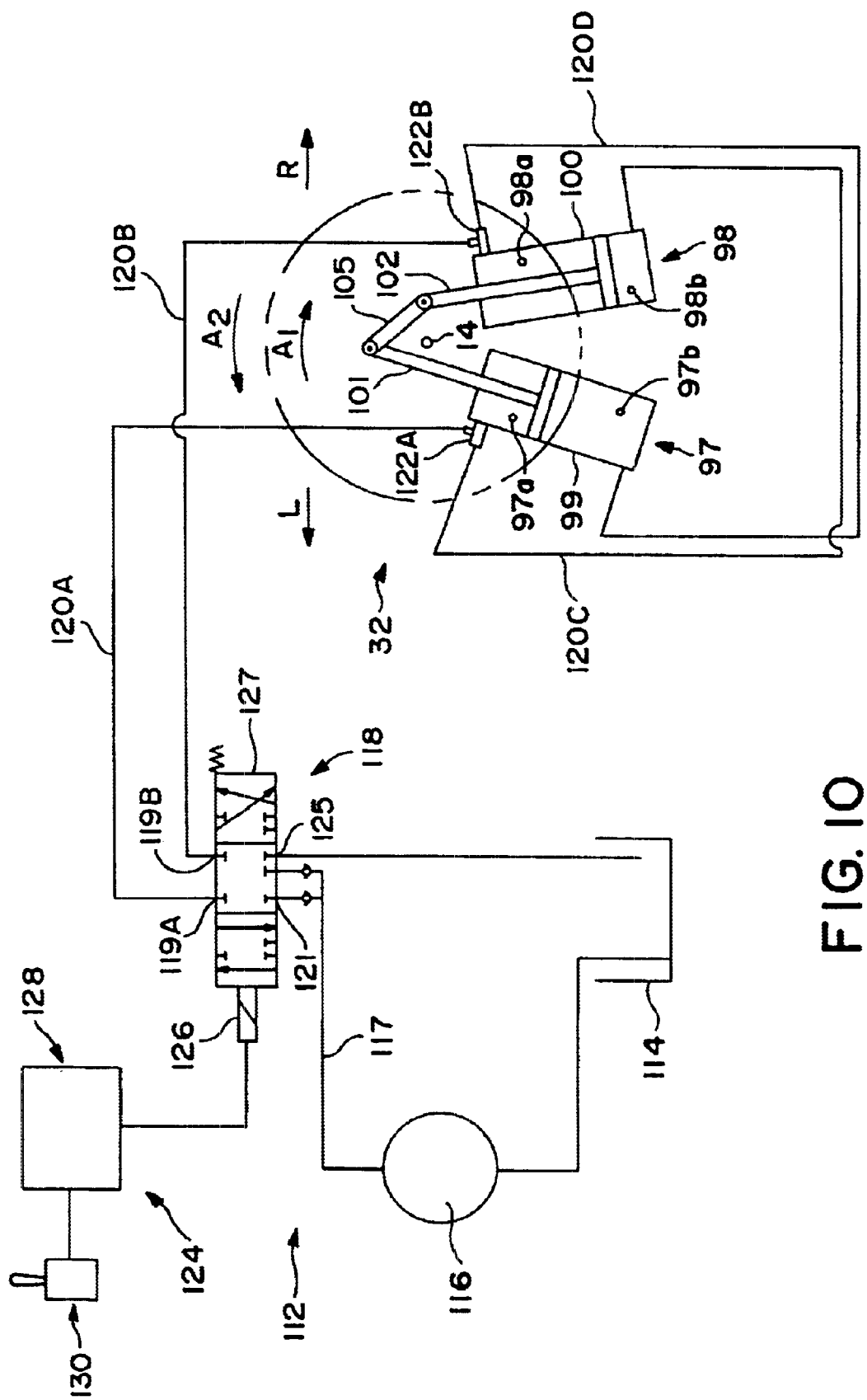
FIG. 10 is a schematic view of a conveyor swing fluid circuit, with portions of the conveyor bearing assembly shown in phantom.

Referring now to FIG. 10, the conveyor assembly 10 preferably further includes a "swing" fluid circuit 112 connected with the swing mechanism 32 and configured to operate the two swing cylinders 97 and 98 so as to rotate the conveyor 18 about the swing axis 14. The swing fluid circuit 112 preferably includes a fluid reservoir 114, a pump 116, a control valve 118 and a plurality of hydraulic lines 120A–120F extending between the valve 118 and the chambers of the first and second cylinders 97, 98, respectively. Further, the swing circuit 112 further includes two flow divider valves, preferably two tee valves 122A, 122B, each directing flow between a separate one of two valve output ports 119A, 119B and the rod chamber 97a, 98a of one cylinder 97, 98 and the base chamber 98b, 97b of the other cylinder 98, 97, respectively, as discussed below.

More specifically, the one tee valve 122A divides fluid flowing from the first valve port 119A through line 120A between the port (not indicated) of the first cylinder rod chamber 97a and a fluid line 120C connected with the base chamber 98b of the second cylinder 98. Alternately, the valve 122A merges fluid flowing from the chambers 97a, 98b and into the valve port 119A. Also, the other tee valve 122B divides fluid flowing from the second valve port 119B through line 120 between the port of the second cylinder rod chamber 98a and a line 120D connected with base chamber 97b of the first cylinder 97. Furthermore, the valve 122B alternately merges fluid flowing from the chambers 98a, 97b and into the second valve port 119B.

Through the tee valves 122A, 122B, the two swing cylinders 97, 98 are fluidly connected such that fluid is permitted to flow between the rod chamber 97a, 98a of each cylinder 97, 98 to the base chamber 98b, 97b of the other cylinder 98, 97, respectively. Preferably, each tee valve 122A, 122B is directly mounted on the associated cylinder 97, 98, respectively, such that a stem portion (not indicated) of each valve 122A, 122B is threaded into the cylinder port (not indicated) into the rod chamber 97a, 98a, as shown in FIG. 10. Alternatively, the valves 122A, 122B may be separately mounted at an appropriate location within the carriage frame 40 or another portion of the conveyor assembly 10.

Still referring to FIG. 10, the control valve 118 is fluidly connected with each of the two swing cylinders 97, 98 and is configured to direct fluid flow through the cylinder bodies 99, 100 to controllably displace the rods 100, 101 so as to angularly displace the conveyor 18 about the swing axis 14. More specifically, the control valve 118 preferably includes two output ports 119A, 119B fluidly connectable with the two swing cylinders 97, 98, a pressure port 121 fluidly connected with the pump 116 and an exhaust port 125 fluidly connected with the fluid reservoir 114. Further, the valve 118 has a control member 127, preferably a linearly displaceable or "slidable" spindle 127, having multiple fluid passages (not indicated) configured to direct flow between the ports 119A, 119B, 121 and 125. The preferred spindle 127 is movable between three valve positions so as to fluidly connect and disconnect the output ports 119A, 119B, and thus the two cylinders 97, 98, with the pressure port 121 or the exhaust port 125, as discussed in the following paragraph. Preferably, the control valve 118 is a three-way spool or spindle valve, and most preferably is a commercially available solenoid-actuated, spring-return spindle valve, as discussed in further detail below.

In a first, "locked" position shown in FIG. 10, the two valve output or control ports 119A and 119B are closed so as to prevent flow between the control valve 118 and the two swing cylinders 97, 98. In this position, the first and second cylinders 97, 98, respectively, are fluidly or hydraulically locked, such that the conveyor 18 is held at a particular angular position about the swing axis 14. In a second valve operational position, fluid (from the pump 116) flows out the first valve control port 119A and into line 120A so as to flow into the first cylinder rod chamber 97a and into the second cylinder base chamber 98b, causing the conveyor to pivot in a first direction, as discussed below. In a third valve operational position, fluid flows out the second valve control port 119B and into line 120B so as to flow into the second cylinder rod chamber 98a and into the first cylinder base chamber 97b, causing the conveyor 18 to pivot in a second, opposing direction, also as discussed below.

Still referring to FIG. 10, the conveyor 18 preferably includes a swing control system 124 configured to controllably operate the swing mechanism 32, and more particularly to control movement of the two cylinders 97, 98, so as to adjustably position the conveyor 18 about the swing axis 14. Preferably, the control system 124 includes a valve actuator 126 mechanically connected with the control valve 118, specifically the spindle 127, and configured to displace the spindle 127 between the three valve positions described above. Preferably, the valve actuator 126 is a linear actuator and most preferably a solenoid (as depicted), but may alternatively be any other appropriate type of actuator, such as a motor operating a power screw, a pilot-valve arrangement, etc. Further, the control system 124 includes a controller 128, which includes an electric logic circuit (not depicted) electrically connected with the actuator 126, and an operator input device 130, such as for example, one or more levers (as depicted), knobs, buttons, etc., operatively connected with the logic circuit. The controller 128 is configured to receive signals, corresponding to desired movements of the conveyor 18, from the input device 130 and to generate and transmit control signals to the valve actuator 126 so as to cause the cylinders 97, 98 to move the conveyor 18 in the desired manner, as described below.

With the above structure of the swing fluid circuit 112 and control system 124, the swing cylinders 97, 98 are operated by appropriately directing fluid to and/or from the cylinder chambers 97a, 97b, 98a and 98b in the following manner. When a conveyor operator desires to swing the conveyor 18 in a particular direction, for example in a first angular direction $A_1$ (clockwise) toward the left of the centerline 11, the operator appropriately manipulates the input device 130 such that the actuator 126 moves the valve spindle 127 to the third position (described above). With the spindle 127 in the third valve position, fluid flow from the pump line 117 is directed out of the second port 119B and is apportioned into one flow into the second cylinder rod chamber 98a, causing the second rod 102 to retract, and another flow into the first cylinder base chamber 97b, causing the first rod 101 to extend. Generally simultaneously, fluid is forced to flow out of the second base chamber 98b (due to rod 101 retraction) and fluid is forced out of the first cylinder rod chamber 97a (due to rod 101 extension). Both these flows enter the first tee valve 122A and combine into a single flow through the first line 120A, into the control port 119A, passing through the control valve 118 and out of exhaust port 125 to the fluid reservoir 114.

Figure 12:
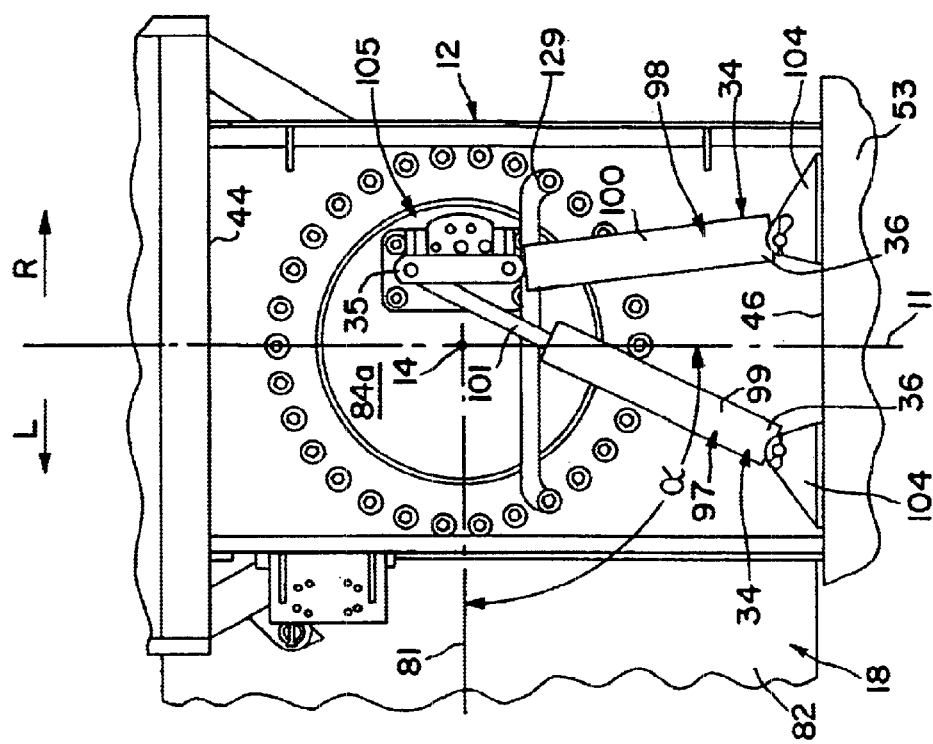
FIG. 12 is another enlarged, partially broken-away bottom plan view of the mobile conveyor assembly of FIG. 11, showing the conveyor swing assembly in a second, "90°-offset" position.

The extension of first rod 101 and retraction of the second rod 102 cause the connected crank 105 and the base frame 80 to rotate about the swing axis 14 in a clockwise direction, such that the conveyor 18 pivots or swings toward the leftward direction L, as discussed below. However, as shown in FIGS. 12 and 13, the crank 105 and conveyor 18 displace to opposing sides of the conveyor centerline 11, for example, the crank 105 displaces to the right side of centerline 11 when the conveyor 18 rotates or swings to the left side of the centerline 11. Therefore, it must be noted that throughout the below description of the conveyor swing process, "left" or "right" positions indicate the position of the conveyor centerline 81 with respect to the assembly centerline 11, while the crank 105 and rod ends 101a, 102a are actually located on the opposite side of the centerline 11.

While the conveyor 18 pivots clockwise between the Centered position (FIG. 11) and the left 45°-offset position (FIG. 13), the net displacement of the two cylinder rods 101, 102 generally correspond, such that the first rod 101 extends by about the same distance as the second rod 102 retracts. However, once the conveyor 18 is moved to about the left 45°-offset position (FIG. 13), the geometrical arrangement of the cylinders 97, 98 is such that the first rod 101 is at maximum extension. Therefore, in order for the conveyor 18 to move any further in the leftward direction L, both rods 101 and 102 must retract. Such simultaneous retraction is enabled by the fact that the axis 101b of the first rod 101 generally intersects the swing axis 14, and the axis 102b of the second rod 102 is generally perpendicular to the swing axis 14. As such, the first rod 101 cannot exert any torque on the crank 105 (i.e., rod 101 has no lever arm about axis 14), while axial force from the second rod 102 exerts maximum torque on the crank 105. Thus, the crank 105, the base frame 80 and the conveyor body 82 continue to rotate about the swing axis 14 primarily by the effort of the second cylinder 98.

Further, the movement of the crank 105 mechanically forces the first rod 101 to retract, causing fluid to flow out of the first cylinder base chamber 97b and into the second cylinder rod chamber 98a (i.e., through tee valve 122B), thereby assisting the retraction of the second rod 102. Simultaneously, fluid continues to flow out of the second base chamber 98b, through line 120C and into the first tee valve 122A, but is now diverted into the first rod chamber 97a (i.e., instead of line 120B) to assist the retraction of the first rod 101. The two rods 101, 102 both continue to retract while the crank 105 and base frame 80 rotate about the swing axis 14 until the conveyor 18 is at about the left 90°-offset position (FIG. 12), at which point further rotation is prevented by the limit bar 129. The operator may stop the movement of the conveyor 18 at any desired angular position (i.e., with respect to axis 14) between the Centered position (FIG. 11) and the left 90°-offset position (FIG. 12), preferably by releasing the operator input device 130 (e.g., lever or button), moving the device 130 to another position, manipulating another portion of the device 130 (e.g., a second button or lever), etc. Upon such operator action, the controller 128 sends a control signal to valve actuator 126 so that the valve spindle 127 returns to the first position (discussed above), causing the two rods 101 and 102 to "lock" in a current position and thereby maintain the conveyor 18 at the desired angular position.

When the operator desires to rotate the conveyor 18 from the left 90°-offset position (FIG. 12) in a counterclockwise direction toward the Centered position (FIG. 11), the actuator 126 moves the control valve spindle 127 from the first valve position to the second valve position. A fluid flow is thereby directed out of the first valve port 119A, through line 120A and into the first tee valve 122A, then through fluid line 120C and into the base chamber 98b of the second cylinder 98, causing the second rod 102 to extend. Due to fluid pressure in the swing circuit 112, fluid flow into the first tee valve 122A is not initially apportioned between line 120C and the first rod chamber 97a, and rather flows substantially entirely into the fluid line 120C. Further, the extension of the second rod 102 forces fluid to flow out of the second rod chamber 98a, through the second tee valve 122B, through line 120D and into first cylinder base chamber 97b, causing the first rod 101 to extend along with the second rod 102. Fluid flow out of the first rod chamber 97a enters the first tee valve 122A, where it combines with the fluid flow from the valve output port 119A, the combined flow being directed into the second cylinder base chamber 100b, assisting the extension of the second rod 102. The two rods 101, 102 both extend to rotatably displace the conveyor 18 in a counterclockwise direction between the left 90°-offset position (FIG. 12) and the left 45°-offset position (FIG. 13).

The hydraulic fluid flows through the swing circuit 112 as described in the preceding paragraph, with both rods 101, 102 continuing to extend, until the crank 105, and thus the base frame 80 and the conveyor body 82, reaches about the 45°-offset position (FIG. 13). At this point in the conveyor swing process, the first rod 101 stops extending and then begins to retract. The flow of fluid through the first cylinder 97 then reverses, such that fluid flow exiting the second cylinder base chamber 98b, which continues to flow into the first tee valve 122A, is diverted from the fluid line 120A and instead flows into the first rod chamber 97a. The retraction of the first rod 101 then forces a fluid flow out of the first base chamber 97b and into the second base chamber 98b to assist in the extension of the second rod 102. Otherwise, the various separate fluid flows through the swing circuit 112 occur as described in the preceding paragraph while the conveyor 18 is angularly displaced in the second angular direction $A_2$ (counterclockwise) from the left 45°-offset position (FIG. 13) and the Centered position (FIG. 11).

Further, if the operator desires to continue swinging the conveyor 18 toward rightward direction R, or if movement is initiated from the Centered position and toward the rightward direction R, the movement of the rods 101, 102 and the flow of working (i.e., hydraulic) fluid occurs as described for counterclockwise movement between the left 45°-offset position (FIG. 13) and the Centered position until the swing assembly reaches the right 45° position (not shown). Thereafter, both rods 99, 101 simultaneously retract with the movement of the crank 105 mechanically forcing the second rod 102 to retract (as described above for clockwise movement), causing fluid to flow out of the second base chamber 98b and into the first rod chamber 98a (i.e., through tee valve 122A), thereby assisting the retraction of the first rod 101. Simultaneously, fluid flow continues out of the second base chamber 98b, through line 120C and into the first tee valve 122A, but is now diverted into the first rod chamber 97a (i.e., instead of line 120B) to assist the retraction of the first rod 101. The two rods 101, 102 both continue to retract while the crank 105 and the conveyor 18 rotate counterclockwise about the swing axis 14 until the conveyor 18 is at about the right 90°-offset position (not shown), at which point further rotation is prevented by the limit bar 129. As discussed above, the operator may use the operator input device 130 to stop the movement of the conveyor 18 at any desired angular position (i.e., with respect to axis 14) between the Centered position and the right 90°-offset position.

Thereafter, the swing conveyor 18 may be rotatably displaced clockwise from the right 90°-offset position in a manner similar to the above-described movement from the left 90°-offset position toward the Centered position. As the pattern of flows through the circuit 112 and movement of the rods 101, 102 can be readily discerned by a person skilled in the fluid control art from the drawing figures and the description above, a description of the movement from the right 90°-offset position toward the Centered position is unnecessary and therefore beyond the scope of the present disclosure.

Further, although the above structure of the conveyor swing mechanism 32 is preferred, the conveyor swing mechanism 32 may be constructed in any other preferred manner functions generally as described herein. For example, the swing mechanism 32 may include a single actuator 34, such as a hydraulic cylinder, connected with the crank 102, or directly with the turntable 84, such that point of attachment of the actuator 34 to the conveyor 18 displaces about the second arcuate path $P_2$ as the second bearing surface 28 displaces along the first arcuate path $P_1$, as each is described above. Further for example, the one or more actuators 34 may be provided by another type of linear actuator, such as a pneumatic cylinder or a electric solenoid, an appropriate rotary actuator, such as a electric or hydraulic motor driving a power screw, or an appropriately constructed linkage. The scope of the present invention includes these and all other alternative constructions of the swing mechanism 32 capable of pivoting the conveyor 18 about the swing axis 14 as generally described herein.

Figure 14:
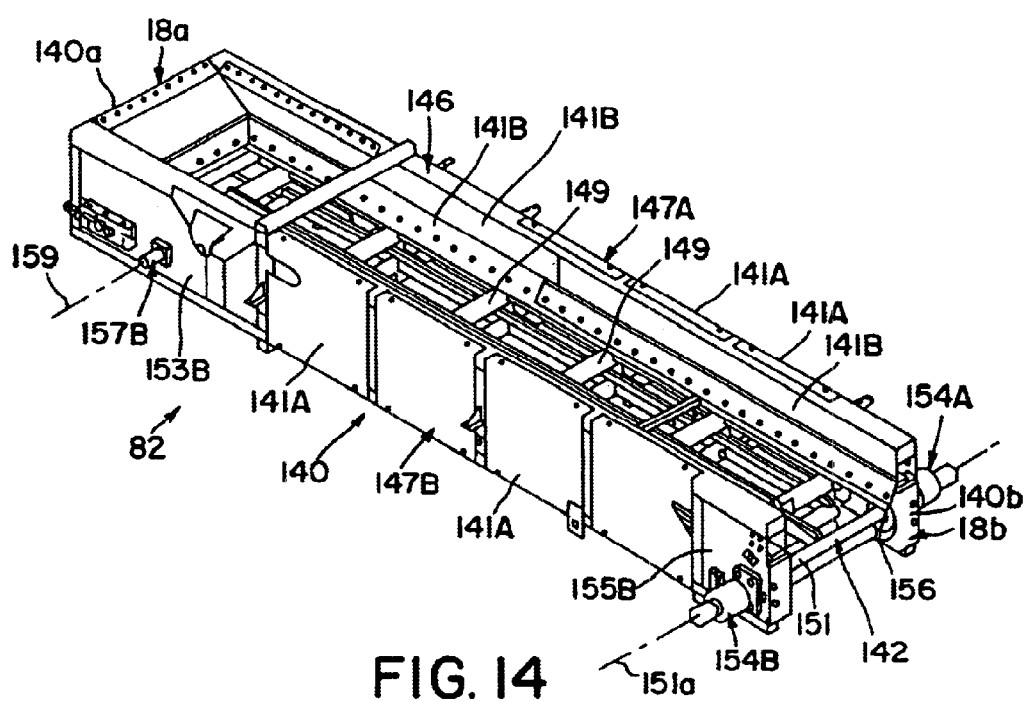
FIG. 14 is a top perspective view, taken from the rear, of a conveyor body.

Referring now to FIGS. 1, 2 and 14, the conveyor body 82 preferably includes a main frame 140 pivotally attached to the base frame 80, at least two spaced-apart shaft assemblies 142, 143 connected with the frame 140 and a continuous or endless conveyor belt assembly 144 disposed about the two shaft assemblies 142 and 143. The main frame 140 has a first end 140a (providing the conveyor inlet end 18a) movably connected with the carriage 12 (i.e., through base frame 80) and a second 140b (providing the conveyor discharge end 18b) spaced from the inlet end 140a along the conveyor body centerline 81. Preferably, the main frame 140 is constructed as an elongated, generally rectangular truss 146 formed of a plurality of structural bars or beams connected together by appropriate means, such as by weldment material, rivets or threaded fasteners. By being formed as a truss 146, the frame 140 is generally more rigid than previously known frame designs, such as a housing formed of plates, of approximately equal weight. Most preferably, the truss 146 includes two spaced-apart sidewalls 147A, 147B and a plurality of cross members 149 extending between and rigidly connecting the sidewalls 147A and 147B. Although the described truss structure is preferred, the conveyor frame 140 may be formed in any other appropriate manner, such as for example, a housing or "shell" formed of attached-together plates (not shown) as mentioned above, with or without a supporting frame structure.

Further, conveyor frame 140 further includes first and second pairs of mounting plates 153A, 153B and 155A, 155B each disposed at a separate frame end 140a and 140b, respectively. The two plates 153A, 153B and 155A, 155B of each pair are spaced apart from each other and are each attached to a separate one of the frame sidewalls 147A, 147B, so as to provide surfaces for mounting the shaft assemblies 142, 143 and other components to the frame 140, as described below. Further, two stub shafts 157A, 157B each extend outwardly from a separate one of the first pair of mounting plates 153A, 153B, respectively, and are generally aligned so as to define a generally horizontal elevational axis 159. The two stub shafts 157A, 157B are each disposeable within a separate one of the bearing openings 87A, 87B through the two yoke walls 86A, 86B, respectively, so as to pivotally attach the conveyor 20 to the base frame 80. The conveyor 20 is thereby pivotable about the elevational axis 159 to adjust the vertical position of the conveyor discharge end 18b, as discussed in further detail below.

Furthermore, the conveyor frame 140 also preferably includes a three-walled inlet chute 148 disposed about the conveyor inlet end 141a and an outlet chute 150 disposed about the conveyor discharge end 143. Each of the chutes 148, 150 is formed to channel paving material respectively onto and off of the belt assembly 144. In addition, the conveyor body 82 preferably includes a plurality of rectangular outer cover panels or plates 141 mounted along the outer surface of each lateral sidewall 147A and 147B of the frame 140. Preferably, the outer cover plates 141A are removably mounted to the sidewalls 147A or 147B, most preferably by a plurality of manually-releasable "finger fasteners" (not shown). By being removably mounted in the described manner, the panels 141 enable ready access to the two shaft assemblies 142, 143 and/or the belt assembly 144 for purposes such as cleaning or repair. Further, the conveyor frame 140 also preferably includes a plurality of elongated rectangular inner cover plates 141B are fixedly attached to the inner surfaces of the two sidewalls 147A, 147B.

Referring to FIGS. 2 and 14, the one shaft assembly 142 is mounted to the frame 140 proximal to the second frame end 140b and is configured as a drive shaft assembly 142. The other shaft assembly 143 is mounted to the frame 146 proximal to the first frame end 140a and is preferably configured as an idler shaft assembly 143. The conveyor belt assembly (not shown) is disposed about both of the shaft assemblies 142 and 143 so as to extend generally along a transport axis 141, which is preferably collinear with the conveyor body axis 81. The drive shaft assembly 142 preferably includes a rotatable shaft 151 extending laterally between the frame sidewalls 147A, 147B and at least one and preferably two drive motors 154A, 154B each connected with an opposing end of the shaft 151. More specifically, the shaft 151 extends between facing inner surfaces of the second pair of mounting plates 155A, 155B and the motors 154A, 154B are each mounted to an outer surface of each plate 155A, 155B. Further, the motors 154A, 154B are preferably hydraulic motors driven by a pump (not shown) and are each configured to rotate the drive shaft 151 about its central axis 151a. Furthermore, the drive shaft assembly 142 also includes a pair of sprocket wheels or sprockets 156 (only one shown) mounted upon the drive shaft 151, the two sprockets 156 being spaced apart along the shaft axis 152a and are configured to engage with and drive the belt assembly, as discussed below.

The idler shaft assembly 143 preferably includes a rotatable shaft 152 extending laterally between the frame sidewalls 147A, 147B and a pair of spaced-apart sprockets (not shown). The idler shaft 152 has two opposing ends each rotatably mounted to separate one of the first pair of mounting plates 153A, 153B, such that the shaft 152 is freely rotatable about its central axis 152a. Further, the idler sprocket wheels are laterally spaced apart by about the same distance as the sprocket wheels 156 on the drive shaft 151 and are configured to engage with the belt assembly, as discussed below.

Preferably, the belt assembly (not shown) includes a chain assembly (not shown) and an endless belt body (not shown) disposed about the chain assembly. Preferably, the chain assembly is formed of a pair of spaced apart, endless chains (not shown) and a plurality of cross members or slats (none shown) extending between and attached at opposing ends to each chain. Further, the belt body is formed as either a one-piece, endless band or a plurality of material strips molded together to form a continuous band. Preferably, the belt body is formed of a natural or synthetic rubber material, most preferably a high temperature oil resistant rubber material. The belt body is disposed about an outer circumferential surface of the chain assembly and is attached to the assembly by appropriate means, such as by a plurality of threaded fasteners.

When the belt assembly is mounted about the drive and idler shaft assemblies 142, 143, respectively, the sprockets 156 of the shaft assemblies 142, 143 engage with the chains of the belt assembly. As such, when the motors 154A, 154B rotate the drive shaft 151 about the shaft axis 151a, the sprockets 156 on the drive shaft 151 continuously rotate the belt chains, such that the chains in turn cause the idler shaft 152 to rotate about the shaft axis 152a and thereby assist with the rotation of the belt assembly. The belt assembly is continuously circulated about or around the shaft assemblies 142, 143 such that material deposited onto the belt assembly, specifically onto the top outer surface of the belt body, is linearly displaced along the transport axis 141 from the conveyor inlet end 18a to the conveyor discharge end 18b.

Referring again to FIGS. 1, 2 and 14, the mobile conveyor assembly 10 further includes an elevating mechanism 160 configured to rotatably displace the conveyor 18 about the elevational axis 159. The elevating mechanism 160 rotates the conveyor 18 about the axis 159 to adjust a vertical angular position, as indicated by angle β (FIG. 1), of the conveyor centerline 81 with respect to the base or ground surface S. As such, the elevating mechanism 160 thereby adjusts the vertical position or height of the conveyor discharge end 143 with respect to the surface S.

Preferably, the elevating mechanism 160 includes one or more hydraulic cylinders, preferably two cylinders 1622 (only one shown) each0 disposed on opposing lateral sides 80a, 80b of the base frame 80 and each extending between the base frame 80 and the conveyor frame 140. More specifically, each cylinder 162 includes a cylinder body 164 pivotally attached at a lower end to the base frame 80, preferably to each yoke wall 86A, 86B so as to be disposed rearwardly of the proximal stub shaft 157A, 157B, respectively. Further, the cylinders 162 each include a rod 166 having a free end 166a attached to the frame 140, preferably by means of a bracket 165. Further, the elevating mechanism 160 preferably includes a fluid circuit (not shown) fluidly interconnecting the two cylinders 162 and including one or more control valves (none shown) controllably directing flow to the cylinders 162. The control valve(s) are operably and fluidly connected (through the circuit) with the two cylinders 162 and are configured to cause each of the two rods 166 to simultaneously extend and to alternately retract by a substantially equal distance.

Referring to FIG. 2, the conveyor assembly 10 preferably further includes a controller 170 disposed on the carriage 12 and configured to automatically and separately operate the control valve(s) of the elevating circuit (neither shown) and also the pump (not shown) driving the hydraulic motors 154A, 154B of the drive shaft assembly 142. More specifically, the controller 170 operates the control valve (not shown) of the elevating fluid circuit to controllably extend and retract the cylinders 162 to thereby adjust the vertical position of the conveyor discharge end 18b. Although a controller 170 is preferred, the conveyor assembly 10 may be constructed without any automatic control device and may instead be operated by separate manual control devices operating the conveyor motor pumps and the elevating mechanism control valve(s) (none shown).

Further, the controller 170 operates the pump to vary the hydraulic flow to the motors 154A, 154B so as to vary motor speed, and thereby the speed of the belt assembly. Preferably, the controller 170 is also configured to separately operate the one or more motors (not shown) driving the primary conveyor 6 on the transfer vehicle 1. The controller 170 is preferably also configured to simultaneously operate the swing conveyor belt assembly and the belt assembly (not indicated) of the primary conveyor 6 to maintain a desired ratio between the speed of the swing conveyor belt assembly and the belt (not indicated) of the primary conveyor 6. Most preferably, the controller 170 maintains the swing conveyor belt assembly displacing along the conveyor axis 83 at about twice the speed of the primary conveyor belt (not indicated), as the primary conveyor belt preferably has a width of about twice the width of the swing conveyor belt 144. Preferably, the controller 170 includes a dual rheostat (not shown) controlling voltage to both the main conveyor pump (not shown) and swing conveyor pump (not shown), which is operated by an input device (e.g., a knob) to selectively provide power to either or both conveyor pumps to allow separate control of the speed of either conveyor 6 or 18.

Further, the controller 170 is preferably incorporated into the swing controller 128, as described above, with the swing mechanism 32, the elevating mechanism 160 and the drive shaft motors 154A and 154B being controllably operated by separate input devices 130 connected with the controller 128. Alternatively, the controllers 128 and 170 may be provided by two separate controllers each having appropriate input devices (not shown).

Although the above structure is presently preferred, the elevating mechanism 160 may be provided by any other appropriate mechanism to pivot the conveyor frame 140 about the horizontal pivot axis 159. For example, the elevating mechanism 160 may be provided by a single cylinder, by a gear train engaged with one or both of the stub shafts 157A and 157B, by an appropriate linkage configured to pivot the frame 140 about the pivot axis 159, by one or more threaded rods, etc. (none shown). The scope of the present invention encompasses these and all other appropriate structures for pivoting the conveyor 20 about the horizontal pivot axis 159 to adjust the vertical position or height of the conveyor discharge end 18b.

Referring to FIGS. 1 and 2, with the above-preferred structure, the mobile conveyor assembly 10 of the present invention is preferably operated in the following manner. Prior to use, the mobile conveyor 10 is first demountably connected with a vehicle 1, and preferably attached to a material transfer vehicle 1 by connecting the linkage 13 of the vehicle 1 to the mounting frame 15 on the carriage 12. Then, the conveyor steering mechanism 26 is operably connected with the vehicle steering mechanism 4 by removably connecting each fluid coupler 73A, 73B, 73C of the carriage steering circuit 70 with each fluid coupler 33A, 33B, 33C of the vehicle steering circuit 19.

Thereafter, the swing conveyor 18 is adjusted to position the conveyor body centerline 81 at a desired angular position a with respect to the assembly longitudinal centerline 11, by using the swing controller 128 to operate the two cylinders 97, 98 of the swing mechanism 32. Also, either before or after (or even simultaneously with) adjusting the angular position α, the conveyor discharge end 18b is positioned at a desired vertical height H above the surface S by rotating the conveyor body 80 about the horizontal elevating axis 159 to adjust the vertical angular position β of the conveyor centerline 81 with respect to the assembly centerline 11.

When the swing conveyor 18 is positioned as desired, the combination of the primary conveyor 6 and the swing conveyor 18 may be used to transfer material from the transfer vehicle hopper 5c (FIG. 1) to the hopper of an offset paver (not shown), or to any other appropriate location. As the transfer vehicle 1 travels forwardly of a paver, any turning of the transfer vehicle 1, caused by an operator steering the front wheel pairs 2A, 2B and 2C, 2D results in a corresponding turning of the carriage wheels 22A, 22B in an opposite direction, such that the inlet end 18a of the swing conveyor 18 is maintained beneath or vertically aligned with the primary conveyor discharge end 6b. Further, when it is desired to use the transfer vehicle 1 for a standard paving operation such that the paver (not shown) travels directly behind the transfer vehicle 1, either the swing conveyor 18 is rotatably angularly displaced to (and retained) in the Centered position, or the entire mobile conveyor assembly 10 is demounted or detached from the transfer vehicle 1.

The mobile conveyor assembly 10 of the present invention has a number of advantages over previous "swing" conveyor designs used with construction vehicles. By having steerable wheels 22A, 22B that are automatically turned in an opposite direction when the wheels 2A–2D of the material transfer vehicle 1 (or other vehicle 1) are turned in a first direction R or L, the mobile conveyor assembly 10 is able to maintain the inlet end 18a of the swing conveyor 18 disposed generally beneath the discharge end 6a of the primary conveyor 6. By maintaining the alignment between the swing conveyor inlet end 18a and the primary discharge end 6b, paving material will continue to deposit into the conveyor inlet 18a even when the vehicle 1 is turned, thereby preventing material from being deposited onto the ground surface S. Further, the configuration of the swing mechanism 32 enables the swing conveyor 18 to be rotatably displaced through a total arc of movement of 180°, and specifically 90° to each side of the assembly centerline 11. By having the actuators 97, 98 connected to the conveyor inside of the bearing assembly 94, the actuators 97, 98 are able to produce a relatively large angular or rotational displacement of the conveyor 18 about the swing axis 14 with a relatively small or lesser displacements of the actuator rods 101 and 102. As discussed above, the configuration of the swing mechanism 32 reduces the space required for installation and operation of the actuators 97, 98 and potentially increases the response speed for angularly positioning the conveyor 18 to a specific angular position about the swing axis 14, and thus positioning the conveyor discharge end 18b at a specific location.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A mobile conveyor assembly for use with a construction vehicle, the vehicle having a wheel pivotable about a pivot axis and a steering actuator configured to pivot the wheel about the axis, the conveyor assembly comprising:

a carriage removably connectable with the vehicle and having a wheel pivotable about a pivot axis;

a conveyor mounted to the carriage; and a steering actuator connected with the carriage wheel and operably connectable with the vehicle actuator, the carriage actuator being configured to pivot the carriage wheel about the carriage wheel pivot axis in a first angular direction when the vehicle actuator pivots the vehicle wheel about the vehicle wheel pivot axis in a second, opposing angular direction.

2. The conveyor assembly as recited in claim 1 wherein the carriage actuator is further configured to pivot the carriage wheel in the second angular direction when the vehicle actuator pivots the vehicle wheel in the first angular direction.

3. The conveyor assembly as recited in claim 1 wherein the vehicle further includes a primary conveyor having a discharge end and the assembly conveyor has an inlet end disposed proximal to the carriage and disposed generally beneath the primary conveyor discharge end when the carriage is connected with the vehicle, the carriage steering actuator being configured to pivot the carriage wheel about the carriage wheel pivot axis so as to maintain the conveyor inlet end positioned generally beneath the primary conveyor discharge end when the vehicle wheel pivots about the vehicle wheel pivot axis.

4. The conveyor assembly as recited in claim 1 wherein:

the vehicle steering actuator is a hydraulic cylinder having a rod connected with the vehicle wheel, the rod being displaceable with respect to the cylinder to angularly displace the vehicle wheel about the vehicle wheel pivot axis; and the carriage steering actuator is a hydraulic cylinder having a rod connected with the carriage wheel, the carriage rod being displaceable with respect to the carriage cylinder to angularly displace the carriage wheel about the carriage wheel pivot axis, the carriage steering cylinder being fluidly connectable with the vehicle steering cylinder such that when the vehicle rod displaces a first distance, the carriage rod displaces a second distance generally equal to the first distance so that a magnitude of the angular displacement of the carriage wheel is generally equal to a magnitude of the angular displacement of the vehicle wheel.

5. The conveyor assembly as recited in claim 4 further comprising a fluid coupler device disconnectably fluidly connecting the carriage hydraulic cylinder with the vehicle hydraulic cylinder.

6. The conveyor assembly as recited in claim 1 wherein:

the carriage wheel is a first carriage wheel and the carriage further includes a second carriage wheel, the second carriage wheel being pivotable about a second carriage wheel pivot axis spaced from and extending generally parallel with the first carriage wheel pivot axis; and the conveyor assembly further comprises a carriage steering mechanism including the carriage steering actuator, the steering mechanism being connected with each of the first and second carriage wheels and configured to pivot each of the first and second carriage wheels in the first angular direction when the vehicle steering actuator pivots the vehicle wheel in the second angular direction and to alternatively pivot each of the first and second carriage wheels in the second angular direction when the vehicle steering actuator pivots the vehicle wheel in the first angular direction.

7. The conveyor assembly as recited in claim 6 wherein the carriage steering actuator is a first hydraulic cylinder and the carriage steering mechanism further includes a second hydraulic cylinder, the second hydraulic cylinder being connected with the second carriage wheel and fluidly connected with the first hydraulic cylinder, and a linkage connected with each one of the first and second hydraulic cylinders and with each one of the first and second carriage wheels, the linkage being configured to simultaneously pivot the first carriage wheel about the first carriage wheel pivot axis and the second carriage wheel about the second carriage wheel pivot axis.

8. The conveyor assembly recited in claim 1 wherein:

the carriage wheel is a first carriage wheel and the steering actuator is a first carriage steering actuator;

the carriage further includes a second carriage wheel, the second carriage wheel being pivotable about a second carriage wheel pivot axis spaced from and extending generally parallel with the first carriage wheel pivot axis; and the conveyor assembly further comprises a second steering actuator connected with the second carriage wheel, fluidly connected with the first carriage steering actuator, and fluidly connectable with the vehicle steering actuator, the second steering actuator being configured to pivot the second carriage wheel in the first angular direction when the vehicle steering actuator pivots the vehicle wheel in the second angular direction and to alternatively pivot the second carriage wheel in the second angular direction when the vehicle steering actuator pivots the vehicle wheel in the first angular direction.

9. The conveyor assembly as recited in claim 1 wherein:

the vehicle steering actuator is a hydraulic cylinder having a rod connected with the wheel and the vehicle further includes a steering valve fluidly connected with the vehicle steering cylinder and configured to direct fluid flow through the vehicle cylinder to displace the rod so as to pivot the vehicle wheel about the vehicle wheel pivot axis; and the carriage steering actuator is a hydraulic cylinder having a rod connected with the carriage wheel, the carriage cylinder being fluidly connectable with the steering valve such that the valve directs fluid flow through the carriage steering cylinder to displace the carriage cylinder rod so as to pivot the carriage wheel about the carriage wheel pivot axis when the vehicle wheel pivots about the wheel pivot axis.

10. The conveyor assembly as recited in claim 9 wherein:

the steering valve has first and second ports, each one of the first and second ports being fluidly connected with the vehicle cylinder and with the carriage cylinder; and the vehicle further includes an operator input device operatively connected with the steering valve and configured to selectively direct fluid flow out of the first port such that carriage wheel pivots in the first angular direction as the vehicle wheel pivots in the second angular direction and to alternatively direct fluid flow out of the second port such that the carriage wheel pivots in the second angular direction as the vehicle wheel pivots in the first angular direction.

11. The conveyor assembly as recited in claim 1 wherein the carriage has a generally vertical swing axis, the conveyor has a discharge end spaced from the carriage, and the conveyor is rotatably connected with the carriage so as to be angularly displaceable about the swing axis such that the discharge end is movable between a first angular position about the swing axis and a second angular position about the swing axis.

12. The conveyor assembly as recited in claim 11 wherein the second angular position is spaced from the first angular position by at least one hundred eighty degrees.

13. The conveyor assembly as recited in claim 1 wherein the carriage wheel is rotatable about a roll axis extending generally perpendicularly to the carriage wheel pivot axis such that the carriage wheel is rollable upon a surface to mobilize the carriage.

14. A construction vehicle assembly comprising:

a first frame having a first wheel pivotable about a first pivot axis;

a first steering actuator configured to pivot the first wheel about the first pivot axis;

a second frame removably connected with the first frame and having a second wheel pivotable about a second pivot axis; and a second steering actuator connected with the second wheel and operably connectable with the first steering actuator, the second steering actuator being configured to pivot the second wheel about the second pivot axis in a first angular direction when the first steering actuator pivots the first wheel about the first pivot axis in a second, opposing angular direction.

15. The construction vehicle assembly as recited in claim 14 further comprising:

a primary conveyor fixedly mounted to the first frame and having a discharge end; and a swing conveyor rotatably connected with the second frame and having an inlet end disposed generally beneath the discharge end of the primary conveyor, wherein the pivoting of the second wheel about the second pivot axis maintains the swing conveyor inlet end positioned generally beneath the primary conveyor discharge end when the first wheel pivots about the first pivot axis.

16. The construction vehicle assembly as recited in claim 14 wherein:

the first steering actuator is a first hydraulic cylinder having a rod connected with the first wheel, the rod being displaceable with respect to the first cylinder to angularly displace the first wheel about the first pivot axis; and the second steering actuator is a second hydraulic cylinder having a rod connected with the second wheel, the second rod being displaceable with respect to the second cylinder to angularly displace the second wheel about the second pivot axis, the second steering cylinder being fluidly connected with the first steering cylinder such that when the first rod displaces a first distance, the second rod displaces a second distance generally equal to the first distance so that a magnitude of the angular displacement of the second wheel is generally equal to a magnitude of the angular displacement of the first wheel.

17. A construction vehicle assembly comprising:

a material transfer vehicle having at least one wheel pivotable about a pivot axis and a steering actuator configured to pivot the wheel about the axis; and a mobile conveyor assembly including a carriage removably connected with the vehicle and having a wheel pivotable about a pivot axis, a swing conveyor mounted to the carriage and a steering actuator connected with the carriage wheel and operably connected with the vehicle actuator, the carriage actuator being configured to pivot the carriage wheel about the carriage wheel pivot axis in a first angular direction when the vehicle actuator pivots the vehicle wheel about the vehicle wheel pivot axis in a second, opposing angular direction.

18. The construction vehicle assembly as recited in claim 17 wherein the carriage actuator is further configured to pivot the carriage wheel in the second angular direction when the vehicle actuator pivots the vehicle wheel in the first angular direction.

19. The construction vehicle assembly as recited in claim 17 wherein the transfer vehicle further includes a primary conveyor having a discharge end and the swing conveyor has an inlet end disposed proximal to the carriage and disposed generally beneath the primary conveyor discharge end, the carriage steering actuator being configured to pivot the carriage wheel about the carriage wheel pivot axis so as to maintain the conveyor inlet positioned generally beneath the primary conveyor outlet when the vehicle wheel pivots about the vehicle wheel pivot axis.

20. The construction vehicle assembly as recited in claim 17 wherein:

the vehicle steering actuator is a hydraulic cylinder having a rod connected with the vehicle wheel, the rod being displaceable with respect to the cylinder to angularly displace the vehicle wheel about the vehicle wheel pivot axis; and the carriage steering actuator is a hydraulic cylinder having a rod connected with the carriage wheel, the carriage rod being displaceable with respect to the carriage cylinder to angularly displace the carriage wheel about the carriage wheel pivot axis, the carriage steering cylinder being fluidly connectable with the vehicle steering cylinder such that when the vehicle rod displaces a first distance, the carriage rod displaces a second distance generally equal to the first distance so that a magnitude of the angular displacement of the carriage wheel is generally equal to a magnitude of the angular displacement of the vehicle wheel.

21. A conveyor assembly comprising:

a base having a swing axis and a first circumferential bearing surface extending at least partially about the axis;

a conveyor rotatably connected with the base and having a second circumferential bearing surface slidably disposed against the first bearing surface, the second bearing surface being linearly displaceable with respect to the first bearing surface along a first arcuate path having a first radius about the pivot axis; and an actuator having an end connected with the conveyor, the actuator being configured to angularly displace the conveyor about the swing axis such that the second bearing surface linearly displaces along the first arcuate path as the actuator end linearly displaces along a second arcuate path having a second radius about the axis, the first path radius being substantially greater than the second path radius such that a magnitude of the second bearing surface linear displacement is substantially greater than a magnitude of the actuator end linear displacement.

22. The conveyor assembly as recited in claim 21 wherein the actuator end is a first end and the actuator further has a second end connected with the base, the actuator being configured to displace the first end with respect the second end so as to displace the first end along the second arcuate path.

23. The conveyor assembly as recited in claim 22 wherein the actuator first end is pivotably attached to the conveyor and the actuator second end is pivotably attached to the base.

24. The conveyor assembly as recited in claim 21 the actuator is a hydraulic cylinder including a cylinder body and a rod having an end providing the actuator end, the rod being displaceable with respect to the body to displace the rod end along the second arcuate path.

25. The conveyor assembly as recited in claim 24 further comprising a control valve fluidly connected with the hydraulic cylinder and configured to direct fluid flow through the cylinder body to controllably displace the rod so as to angularly displace the conveyor about the swing axis.

26. The conveyor assembly as recited in claim 21 wherein:
the base has a generally horizontal centerline generally intersecting the swing axis ;
the conveyor has a first end disposed proximal to the base, a second end spaced from the first end so as to be located distal from the base and a centerline extending between the first and second ends and generally intersecting the swing axis; and
the actuator is configured to angularly displace the conveyor about the swing axis so as to move the conveyor centerline between a first angular position with respect to the base centerline and a second angular position with respect to the base centerline so as to linearly displace the conveyor second end between a first position and a second position.

27. The conveyor assembly as recited in claim 26 wherein the first angular position and the second angular position are spaced apart by about one hundred eighty degrees such that the conveyer centerline extends in a first direction in the first angular position and a generally opposing second direction in the second angular position.

28. The conveyor assembly as recited in claim 21 wherein:
the base includes a first generally annular body having a surface providing the first bearing surface;
the conveyor includes a second generally annular body having a surface providing the second bearing surface, one of the first and second annular bodies being slidably disposed within the other one of the first and second annular bodies so as to rotatably connect the conveyor with the base.

29. The conveyor assembly as recited in claim 21 wherein the actuator is a first actuator and the conveyor assembly further comprises a second actuator having an end connected with the conveyor, the second actuator end being spaced from the first actuator end, the second actuator being configured to displace the second actuator end along a third arcuate path having a third radius about the swing axis, the third radius being substantially equal to the second radius, and the two actuator ends displace generally simultaneously to angularly displace the conveyor about the swing axis.

30. The conveyor assembly as recited in claim 29 wherein:
the first actuator is a first hydraulic cylinder including a cylinder body and a rod having an end providing the first actuator end, the rod being displaceable with respect to the body to displace the rod end along the second arcuate path; and
the second actuator is a second hydraulic cylinder including a cylinder body and a rod having an end providing the second actuator end, the second rod being displaceable with respect to the second body to displace the second rod end along the third arcuate path, such that displacement of the first rod with respect to the first cylinder body and displacement of the second rod with respect to the second cylinder body angularly displaces the conveyor about the swing axis.

31. The conveyor assembly as recited in claim 30 wherein the first and hydraulic cylinders are fluidly interconnected and the conveyor assembly further comprises a control valve fluidly connected with each one of the first and second cylinder bodies and configured to direct fluid flow through the two cylinder bodies to controllably displace the two cylinder rods so as to adjustably position the conveyor about the swing axis.

32. The conveyor assembly as recited in claim 21 wherein the base is a carriage including a frame and at least one wheel rotatably connected to the frame and configured to mobilize the conveyor assembly, the carriage frame being configured to demountably connect with a construction vehicle such that the conveyor assembly is transportable by the construction vehicle.

33. A conveyor assembly comprising:
a base having a swing axis;
a first generally annular bearing body connected with the base and substantially centered about the axis;
a conveyor having a second generally annular bearing body slidably engaged with the first bearing body so as to rotatably connect the conveyor to the base; and
an actuator having a first end connected with the conveyor and a second end connected with the base, the first end being disposed generally between the second bearing body and the axis, actuator being configured to displace the first end with respect to the second end so as to angularly displace the conveyor about the swing axis as the second bearing body slidably displaces with respect to the first bearing body.

34. The conveyor assembly as recited in claim 33 wherein a magnitude of the displacement of the second bearing body is substantially greater than a magnitude of the displacement of the actuator first end.

35. The conveyor assembly as recited in claim 33 wherein:
the second bearing body is linearly displaceable with respect to the first bearing body along a first arcuate path having a first radius about the pivot axis; and
an actuator first end is linearly displaces along a second arcuate path having a second radius about the axis, the first path radius being substantially greater than the second path radius such that a magnitude of the second bearing surface linear displacement is substantially greater than a magnitude of the actuator end linear displacement.

36. The conveyor assembly as recited in claim 35 wherein the actuator is a hydraulic cylinder including a cylinder body providing the second actuator end and a rod providing the actuator first end, the rod being displaceable with respect to the cylinder body to displace the rod end along the second arcuate path.

37. The conveyor assembly as recited in claim 36 further comprising a control valve fluidly connected with the hydraulic cylinder and configured to direct fluid flow through the cylinder body to controllably displace the rod with respect to the cylinder body so as to angularly displace the conveyor about the swing axis.

38. The conveyor assembly as recited in claim 33 wherein the actuator is a first actuator and the conveyor assembly further comprises a second actuator having a first end connected with the conveyor and a second end connected with the base, the second actuator first end being spaced from the first actuator first end, the second actuator being configured to displace the second actuator first end along a third arcuate path having a third radius about the swing axis, the third radius being substantially equal to the second radius, and the two actuator first ends displace generally simultaneously to angularly displace the conveyor about the swing axis.

39. The conveyor assembly as recited in claim 38 wherein:
the first actuator is a first hydraulic cylinder including a cylinder body and a rod having an end providing the first actuator first end, the rod being displaceable with respect to the body to displace the rod end along the second arcuate path; and
the second actuator is a second hydraulic cylinder including a cylinder body and a rod having an end providing the second actuator second end, the second rod being displaceable with respect to the second body to displace the second rod end along the third arcuate path, such that displacement of the first rod with respect to the first cylinder body and displacement of the second rod with respect to the second cylinder body angularly displaces the conveyor about the swing axis.

40. The conveyor assembly as recited in claim 39 wherein the first and hydraulic cylinders are fluidly interconnected and the conveyor assembly further comprises a control valve fluidly connected with each one of the first and second cylinder bodies and configured to direct fluid flow through the two cylinder bodies to controllably displace the two cylinder rods so as to adjustably position the conveyor about the swing axis.

41. A conveyor assembly comprising:
a conveyor base having a conveyor swing axis and a first circumferential bearing surface extending at least partially about the axis;
a conveyor body rotatably connected with the base and having a second circumferential bearing surface, the second bearing surface being slidably disposed against the first bearing surface and generally centered about the swing axis by a first radial distance; and
a hydraulic cylinder having a cylinder body connected with the base and a rod displaceable with respect to the rod, the rod being connected with the conveyor at a position spaced from the swing axis by a second radial distance, the first radial distance being substantially greater than the second radial distance such that displacement of the rod angularly displaces the conveyor about the swing axis as the second circumferential surface linearly displaces with respect to the first circumferential surface, a magnitude of displacement of the second circumferential surface being substantially greater than a magnitude of displacement of the rod.

42. A mobile conveyor assembly for use with a construction vehicle, the vehicle having a wheel pivotable about a pivot axis and a steering actuator configured to pivot the wheel about the axis, the conveyor assembly comprising:
a carriage removably connectable with the vehicle and having a wheel pivotable about a pivot axis, a swing axis and a first circumferential bearing surface extending at least partially about the swing axis;
a steering actuator connected with the carriage wheel and operably connectable with the vehicle actuator, the carriage actuator being configured to pivot the carriage wheel about the carriage wheel pivot axis in a first angular direction when the vehicle actuator pivots the vehicle wheel about the vehicle wheel pivot axis in a second, opposing angular direction;
a conveyor rotatably connected with the base and having a second circumferential bearing surface slidably disposed against the first bearing surface, the second bearing surface being linearly displaceable with respect to the first bearing surface along a first arcuate path having a first radius about the pivot axis; and
a swing actuator having an end connected with the conveyor, the actuator being configured to angularly displace the conveyor about the swing axis such that the second bearing surface linearly displaces along the first arcuate path as the actuator end linearly displaces along a second arcuate path having a second radius about the axis, the first path radius being substantially greater than the second path radius such that a magnitude of the second bearing surface linear displacement is substantially greater than a magnitude of the actuator end linear displacement.

* * * * *